United States Patent
Brungs et al.

(10) Patent No.: US 6,888,708 B2
(45) Date of Patent: May 3, 2005

(54) METHOD AND APPARATUS FOR CONTROL AND DETECTION IN RESISTANCE GROUNDED ELECTRICAL SYSTEMS

(75) Inventors: William T. Brungs, North Bend, OH (US); Thomas R. Yingling, Batavia, OH (US); Douglas E. Frushour, Burlington, KY (US)

(73) Assignee: Post Glover Resistors, Inc., Erlanger, KY (US)

( * ) Notice: Subject to any disclaimer, the term of this patent is extended or adjusted under 35 U.S.C. 154(b) by 0 days.

(21) Appl. No.: 10/175,618

(22) Filed: Jun. 20, 2002

(65) Prior Publication Data

US 2003/0043515 A1 Mar. 6, 2003

Related U.S. Application Data

(60) Provisional application No. 60/299,648, filed on Jun. 20, 2001.

(51) Int. Cl.[7] .................................................. H02H 3/16
(52) U.S. Cl. .......................................... 361/42; 361/44
(58) Field of Search ............................. 361/42, 43, 44, 361/45–50; 324/509; 340/650

(56) References Cited

U.S. PATENT DOCUMENTS

| | | | |
|---|---|---|---|
| 4,151,460 A | 4/1979 | Seese et al. | |
| 4,343,027 A | 8/1982 | Kai | |
| 4,377,837 A | 3/1983 | Matsko et al. | |
| 4,631,625 A | 12/1986 | Alexander et al. | |
| 4,800,509 A | 1/1989 | Nimmersjö | |
| 4,837,519 A | 6/1989 | Lopetrone et al. | |
| 4,878,142 A | 10/1989 | Bergman et al. | |
| 4,884,034 A | 11/1989 | Guzman | |
| 4,922,363 A | 5/1990 | Long et al. | |
| 5,416,416 A | * 5/1995 | Bisher | 324/426 |
| 5,432,455 A | 7/1995 | Blades | |
| 5,434,509 A | 7/1995 | Blades | |
| 5,475,557 A | 12/1995 | Larom et al. | |
| 5,485,394 A | 1/1996 | Murata et al. | |
| 5,576,695 A | 11/1996 | Minger et al. | |
| 5,600,248 A | 2/1997 | Westrom et al. | |
| 5,691,869 A | 11/1997 | Engel et al. | |
| 5,699,219 A | 12/1997 | Arita et al. | |
| 5,729,145 A | 3/1998 | Blades | |
| 5,963,405 A | 10/1999 | Engel et al. | |

(Continued)

OTHER PUBLICATIONS

Post Glover Resistors Inc., *Post Glover Neutral Grounding Resistors Technical Bulletin*, pp. 1–20, (Dec. 1997).
Post Glover Resistors Inc., *Instruction Manual, High Resistance Grounding Equipment*, Mag–38812, pp. 1–10.
IEEE Transactions on Industry Applications, *High–Resistance Grounding of Low–Voltage Systems: A Standard for the Petroleum and Chemical Industry*, vol. 35, No. 4, Jul./Aug. (1999).

*Primary Examiner*—Stephen W. Jackson
*Assistant Examiner*—Danny Nguyen
(74) *Attorney, Agent, or Firm*—Dinsmore & Shohl LLP

(57) ABSTRACT

A ground fault detector for use in resistance grounded electrical systems. In one embodiment, the system includes a digital processor to monitor an electrical parameter of the resistance to determine and indicate whether a ground fault has occurred. Data regarding the ground fault occurrence can then be digitally stored transmitted, or processed, such as by an external computer. In another embodiment, the ground fault detector includes a filter to remove the harmonic components of the monitored electrical parameter, to avoid false alarms. In addition, in another embodiment, the ground fault detector can also determine whether a high harmonic condition is present in the monitored electrical system. The phase of the electrical system can be grounded by pressing a test switch, thereby causing a ground fault and allowing the harmonic components of the signal in the electrical system to be monitored.

19 Claims, 31 Drawing Sheets

U.S. PATENT DOCUMENTS

| | | |
|---|---|---|
| 6,005,757 A | 12/1999 | Shvach et al. |
| 6,262,871 B1 * | 7/2001 | Nemir et al. .................. 361/42 |
| 6,274,851 B1 * | 8/2001 | Mulcahy et al. ............. 219/501 |
| 6,361,205 B2 * | 3/2002 | Andersen ..................... 374/45 |
| 6,366,208 B1 * | 4/2002 | Hopkins et al. ............. 340/650 |
| 6,466,029 B2 * | 10/2002 | Stroth et al. ................. 324/509 |
| 6,473,281 B1 * | 10/2002 | Kornblit ...................... 361/42 |

* cited by examiner

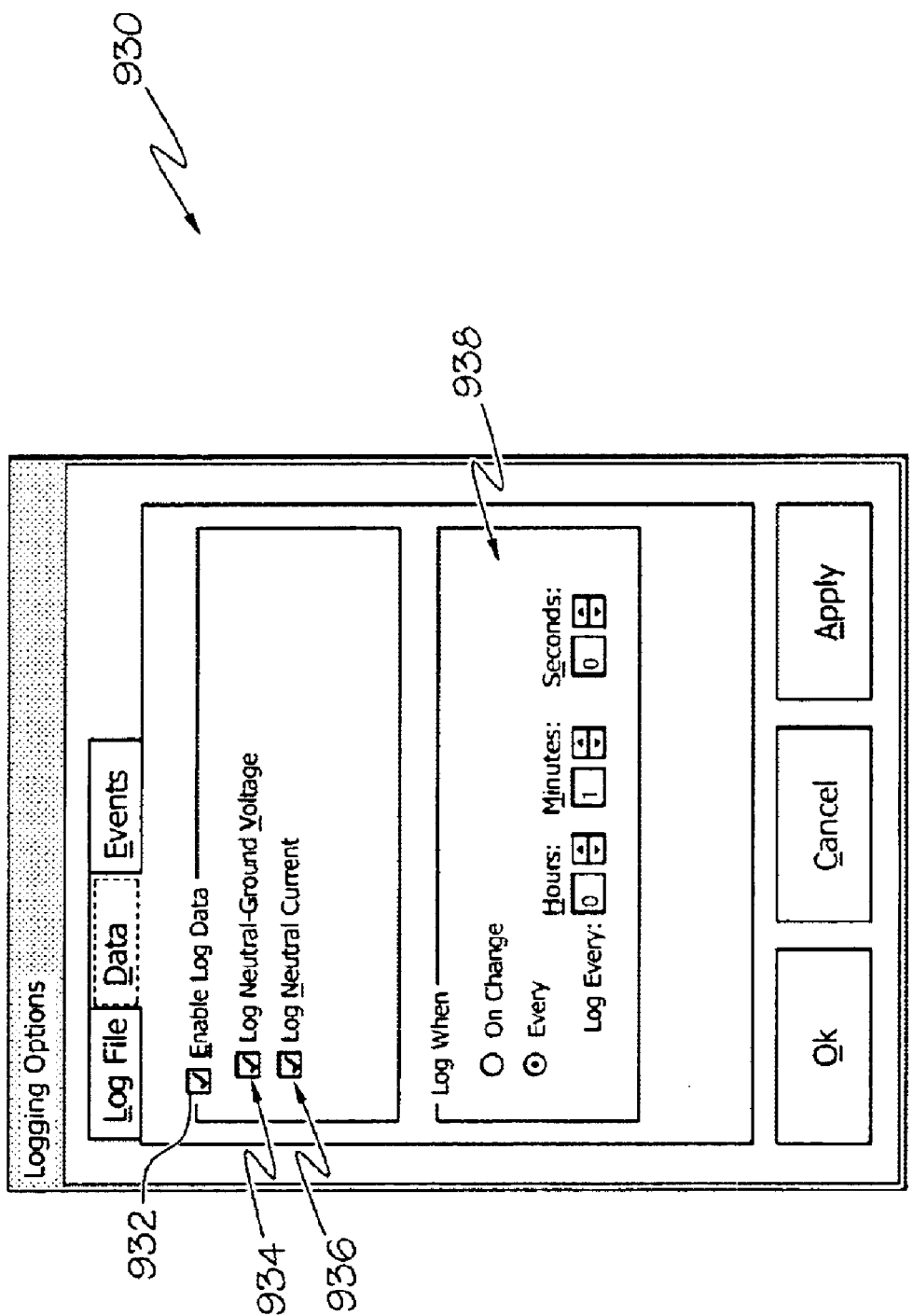

METHOD AND APPARATUS FOR CONTROL AND DETECTION IN RESISTANCE GROUNDED ELECTRICAL SYSTEMS

CROSS-REFERENCE TO RELATED APPLICATION

This application claims the benefit of U.S. patent application No. 60/299,648, filed Jun. 20, 2001, the entire disclosure of which is hereby incorporated herein by reference.

TECHNICAL FIELD

The present invention relates generally to electrical systems having resistance grounding, and more particularly to controllers for detecting and/or locating ground faults or other faults in such systems.

BACKGROUND OF THE INVENTION

Electrical systems, such as those which power industrial equipment and plants and those used in power distribution, often are grounded to prevent damage to the system components during ground faults due to overvoltages or phase-to-phase faults. Outages caused by ground faults in ungrounded systems are particularly damaging and costly in continuous manufacturing processes, where an uncontrolled shutdown of the system can be particularly problematic. To prevent such damage and problems, such systems have been grounded, such as by providing a solid connection from the system neutral to ground. Relays can then be utilized to isolate the defective part of the system during ground fault occurrences.

However, even with solid grounding of a system, damage can still occur during ground fault conditions, and the damage at the point of the fault can still be excessive. Accordingly, systems have been developed which place a low resistive impedance (e.g., a resistor of low resistance) between the neutral and ground. This practice reduced fault damage to acceptable levels by lowering the ground fault current passed during a ground fault condition.

However, the ground fault current in such low resistance grounded systems could still remain high enough to effectively shut off the defective portion of the system via relays. Yet some users still prefer to maintain electrical service if possible even with a ground fault present on the system. If a shutdown of the system or portions of the system is necessary, it can then be conducted in a controlled fashion, rather than in an abrupt haulting of the process or the equipment. Moreover, low voltage solidly grounded systems can present flash hazards to those who work on the systems and solidly grounded systems can also pose the risk of sustained destructive arcs without initiating an automatic trip of the protection relays.

To overcome these problems, high resistance grounding of electrical systems was developed in which the system neutral was grounded through a high resistance resistor to limit the ground-fault current flow to a value equal to or slightly greater than the capacitive charging current of the system. This value of the resistance is chosen because it is the lowest level of ground-fault current flow at which system overvoltages can be effectively limited, thereby providing overvoltage protection. (Typically, a system is considered to be a high resistance grounded system if the initial current is limited by the resistance to about 25 amps or less, and often the resistance is chosen to limit the current to no more than about 10 amps.) Thus, such high resistance grounded systems can allow for continuous operation or controlled shutdown of the process equipment during a ground fault, while also providing overvoltage protection and point-of-fault damage protection.

Control and detection devices have also been developed for use with resistance grounded systems, such as the high resistance grounded systems described above. These devices have provided fault detection warnings, such that the ground fault cause and location can be investigated and corrected, potentially without shutting down the equipment. In particular, the current through or voltage across the grounding resistor can be monitored. When the normal current or voltage is detected, normal operation is indicated such as by using a green light, but when a non-normal current or voltage is detected for a predetermined amount of time, an alarm signal is activated.

Moreover, such devices have also provided fault location tracking through the use of a switch which provides current pulses into the system. To locate the ground fault, a pulsing circuit has been utilized which shorts out a portion of the grounding resistor and provides current pulses into the electrical system. A portable ammeter could then be used to test various nodes in the electrical system and when the pulses are not detected by the ammeter, the location of the ground fault has been located.

While such control and detection devices have been advantageous for use with resistance grounded systems, some disadvantages remain. For instance, such devices are generally based upon analog circuitry and thus can require time and expense in wiring several discrete components. Moreover, such devices can take up significant space, can suffer from accuracy problems, and/or can be subject to reverse engineering. Data logging and connection capability have also not typically been provided in such devices, and upgrades to the system require the time and expense of upgrading system components. Moreover, such devices can be subject to false ground fault alarms due to high frequency distortion (i.e., harmonics) in the electrical system monitored. Finally, typical ground fault control devices do not detect or provide an indication of high harmonic levels. Accordingly, it is desirable to provide improved ground fault control devices for resistance grounded systems which overcome one or more of these drawbacks.

SUMMARY OF THE INVENTION

It is an advantage of at least one embodiment of the present invention to obviate one or more of the above-described problems.

In particular, an advantage of at least one embodiment of the invention is to provide a ground fault detection device which requires less wiring, can be easily upgraded, takes up less space, is more accurate, and/or can be easily connected to other programming or storage devices.

Moreover, an advantage of at least one embodiment of the invention is to provide a ground fault detection device which is less prone to false alarms.

Furthermore, it is an advantage of at least one embodiment of the invention to provide a ground fault detection device which provides high harmonic detection capability.

In addition, it is an advantage of at least one embodiment of the invention to provide a ground fault detection device which can record ground fault historical data to allow for the identification of causes of unsustained or intermittent ground faults.

In accordance with one embodiment of the invention, a high resistance grounding system is provided. The system comprises a neutral conductor; a phase conductor and a ground connection. In the system, a high resistance resistor is connected between the neutral conductor and the ground connection. Furthermore, the system includes a digital processor configured to determine whether a ground fault has occurred by monitoring an electrical parameter of the high resistance resistor.

According to another aspect of the invention, a ground fault detector for a resistance grounded electrical system is provided. The detector comprises a ground input connected to a ground in an electrical system and providing a ground signal. The ground is connected to a neutral in the electrical system through a resistor. The detector further comprises a filter configured to provide a harmonic frequency signal from the ground signal. Moreover, the detector includes a detection circuit configured to determine a ground fault condition from the ground signal and a high harmonic condition from the harmonic frequency signal, and at least one output device controlled by the detection circuit to indicate the ground fault condition and the high harmonic condition.

In accordance with another embodiment of the invention, a ground fault detector for a resistance grounded electrical system is provided. The detector comprises a neutral input configured to be connected to the neutral conductor of an electrical system, and a ground input configured to be connected to the ground conductor of an electrical system that connects to the neutral conductor through a neutral grounding resistor. Moreover the detector includes a signal conditioning circuit connected to the neutral and ground inputs and adapted to provide a measure of an electrical parameter associated with the neutral grounding resistor. The detector further includes an analog-to-digital converter configured to convert the measure to a digital signal. In addition, the detector includes a digital processor configured to receive the digital signal from the analog-to-digital converter and to execute a program to determine whether a ground fault has occurred based upon the level of the digital signal.

According to another aspect of the invention, a ground fault detector for a resistance grounded electrical system is provided. The detector includes a ground input connected to a ground in an electrical system and providing a ground signal. The ground is connected to a neutral in the electrical system through a resistor. Also included in the detector is a filter configured to separate the fundamental and harmonic components of the ground signal. Furthermore, the detector includes a detection circuit configured to determine a ground fault condition from the fundamental component of the ground signal.

According to another aspect of the invention, a ground fault detector system is provided having data logging capability. The system comprises a resistor connected between the neutral and ground of a monitored electrical system. The system further comprises a digital detection circuit configured to determine a ground fault condition from an electrical parameter of the resistor. In addition, the system comprises a digital communication link, and a digital storage apparatus in communication with the digital detection circuit via the digital communication link and configured to receive signals from the digital detection circuit.

Still other advantages, aspects, and embodiments will become apparent to those skilled in this art from the following description wherein there is shown and described exemplary embodiments of this invention simply for the purposes of illustration. As will be realized, the invention is capable of other different aspects and embodiments without departing from the scope of the invention. Accordingly, the advantages, drawings, and descriptions are illustrative in nature and not restrictive in nature.

BRIEF DESCRIPTION OF THE DRAWINGS

While the specification concludes with claims particularly pointing out and distinctly claiming the invention, it is believed that the same will be better understood from the following description of illustrative embodiments taken in conjunction with the accompanying drawings in which like reference numerals indicate corresponding structure throughout the figures.

FIGS. 9A–9E show illustrative screens that could be generated by such a software program that can be executed on a computer that is in communication with a ground fault detector via a digital communication link, in accordance with principles of the present invention.

DETAILED DESCRIPTION OF ILLUSTRATIVE EMBODIMENTS

In general, one exemplary embodiment of the present invention relates to a ground fault detector for a resistance grounded electrical system. The detector includes a neutral input configured to be connected to the neutral conductor of an electrical system, and a ground input configured to be connected to the ground conductor of an electrical system that connects to the neutral conductor through a neutral grounding resistor. The detector includes a digital processor which receives a digital signal indicative of a measure of an electrical parameter of the resistor, such as the current flowing through the resistor or the voltage across the resistor. The processor is configured to execute a program to determine whether a ground fault has occurred based upon the level of the digital signal. A switch can also be provided to allow for the introduction of a locator signal into the electrical system, to assist in locating the location of a ground fault, when one has been detected. Moreover, according to another embodiment which can operate on analog and/or digital signals, a filter can be provided to filter out harmonic frequencies prior to processing of the monitored signals, to assist in preventing false ground fault alarms due to high harmonics. In addition or as an alternative, the harmonic frequencies in the filtered signal can be analyzed to determine whether any high harmonics exist, and, if so, an alarm can be provided.

Figure 1:
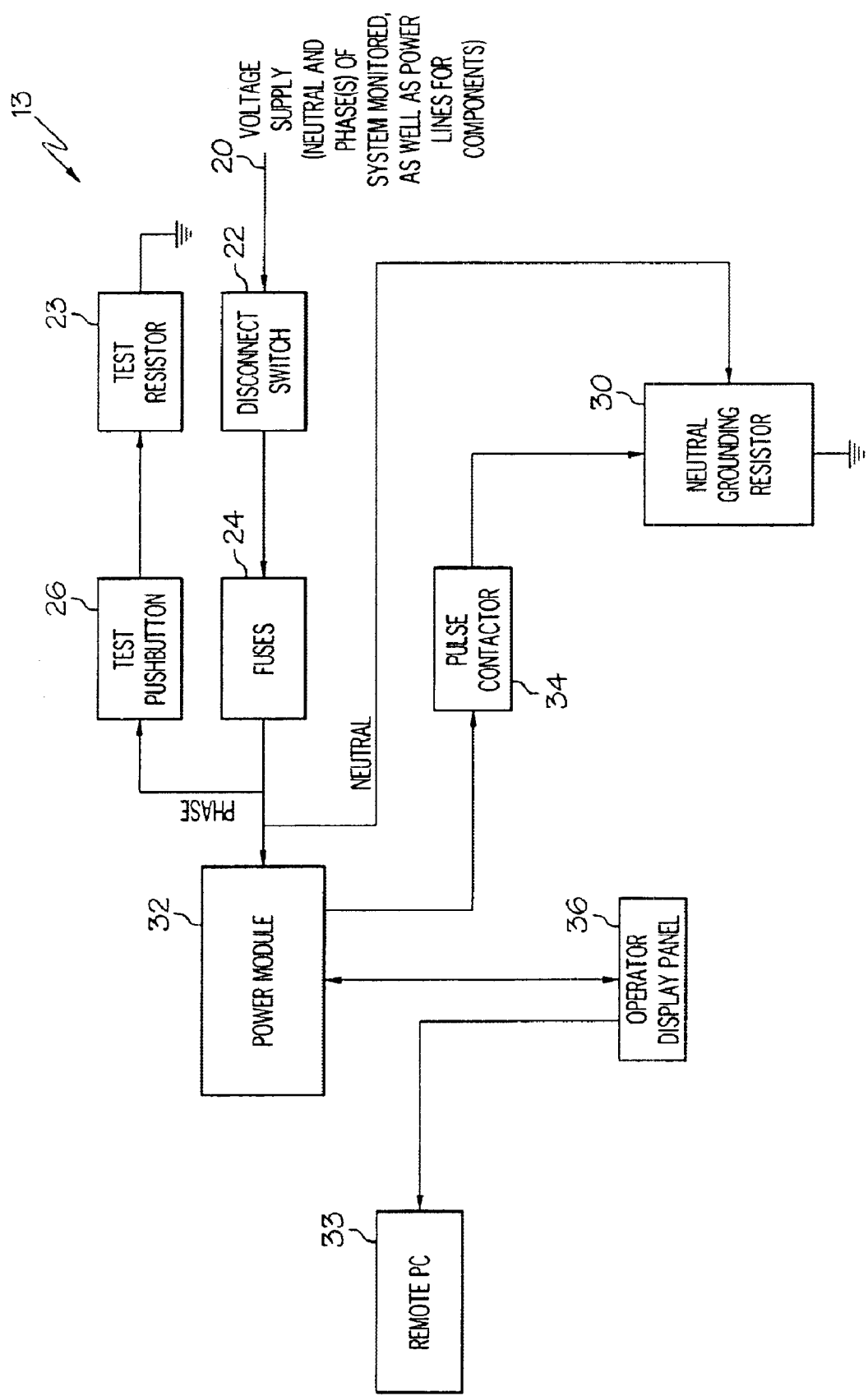
FIG. 1 is a block diagram of an illustrative ground fault detector providing of the present invention.

FIG. 1 is a block diagram of an exemplary ground fault detector 18 for monitoring a resistance grounded electrical system, made in accordance with principles of the present invention. In this exemplary embodiment, the conductors of the electrical system being monitored can be provided on line 20 to a disconnect switch 22, which can be used to allow easy connection of the detector components to the monitored electrical system. These conductors can include the neutral conductor, as well as a phase conductor if forced ground fault capability is to be utilized for testing the system and/or measuring harmonics. The electrical system monitored can be any of a variety of electrical systems, such as those which power industrial equipment and processes, for example. In addition, power supply conductors for the detector components 18 can also be provided and are also represented by line 20. The output of the disconnect switches 22 can be connected to fuses 24, to provide fuse protection for the various conductors received. The voltage phase of the electrical system monitored can then be fed to a test pushbutton 26 which connects to a ground through a resistor 28. Thus, pressing the pushbutton 26 will provide a ground fault occurrence by intentionally grounding the phase, and it can be determined whether the detector 18 is operating correctly by checking to see if a fault is detected when the test pushbutton 26 is pressed.

In this embodiment, the detector 18 also provides neutral grounding of the electrical system monitored. In particular, the neutral of the system monitored can be connected to ground through a neutral grounding resistor 30. This resistor 30 may comprise a high value resistor, such as one that limits the ground-fault current flow to a value equal to or slightly greater than the capacitive charging current of the system. Accordingly, in this example, the detector 18 provides high resistance grounding of the electrical system monitored.

The phase and neutral conductors and power supply conductors can then be provided to a power module 32. As described in more detail below, in one embodiment, this module 32 can provide signal conditioning (e.g., amplification, calibration, and/or conversion) of the signals received from the monitored electrical system, can provide switching between the conductors monitored, can provide filtering of harmonic frequencies, and/or can drive output devices via relays. The output devices can indicate whether a ground fault has been detected. The power module 32 can also connect to a pulse contactor 34 which can be utilized to introduce pulses, or other desired locator or signature signals, into the monitored electrical system to allow the user to locate the fault when a ground fault is detected.

Moreover, the power module 32 can connect to an operator display module or operator panel 36. As described in further detail below, this module 36 includes ground fault detection circuitry which, in this embodiment, includes a digital processor which operates a program (stored in memory as software and/or firmware) to determine whether a ground fault has been detected. Input devices and display devices can be provided on this module 36 to allow the operator to set up parameters to be used in the monitoring of the electrical system by the processor and/or to modify the program executed by the processor. As an option, an auxiliary digital device, such as a remote personal computer (PC) 38 or other digital storage device, can be connected to the module 36 to allow for data logging and other communication. If desired, programming changes and control could also be provided by this auxiliary digital device.

Figure 2A:
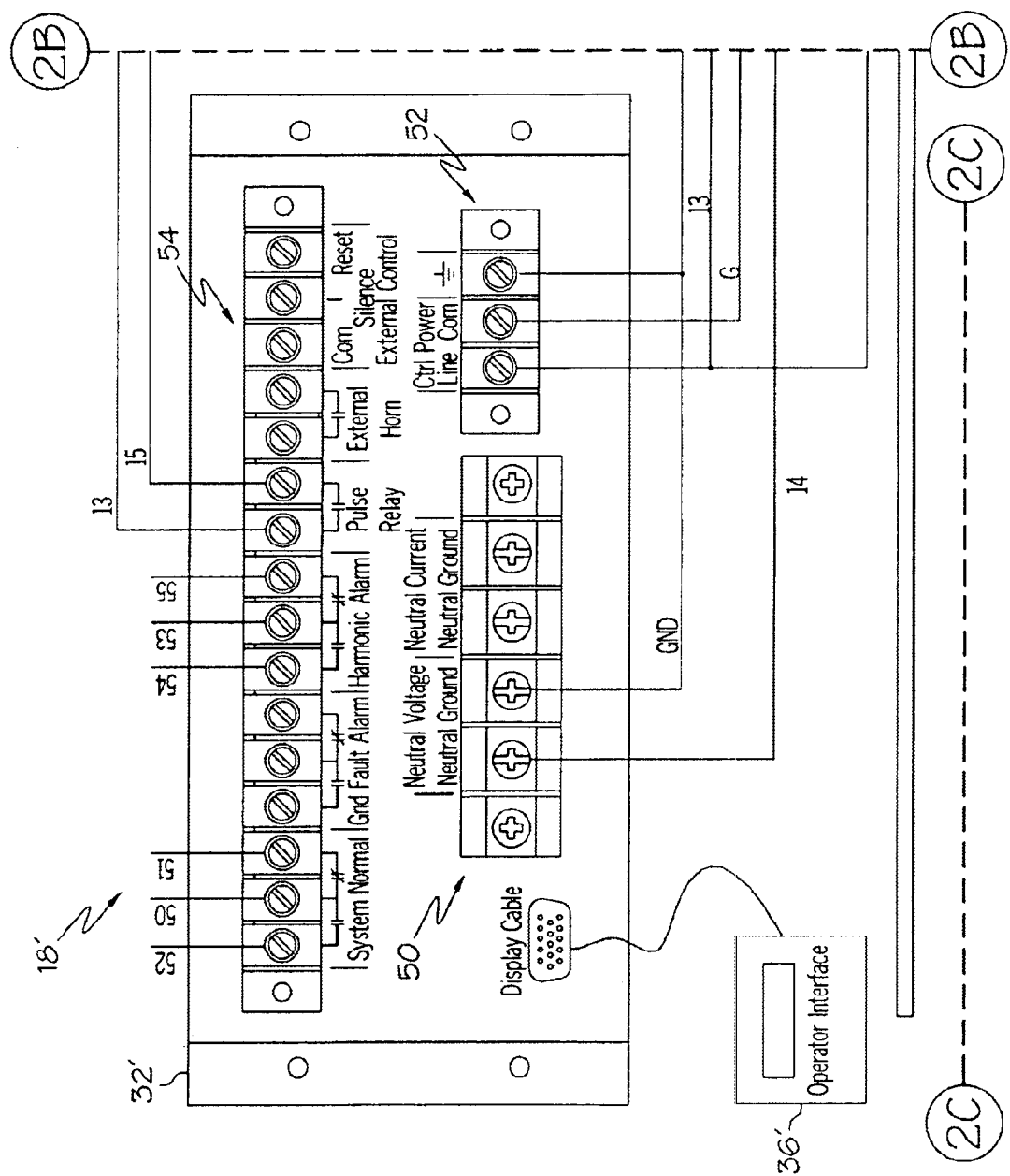
FIG. 2 is a circuit diagram showing one illustrative circuit configuration of the exemplary detector of FIG. 1.
Figure 2B:
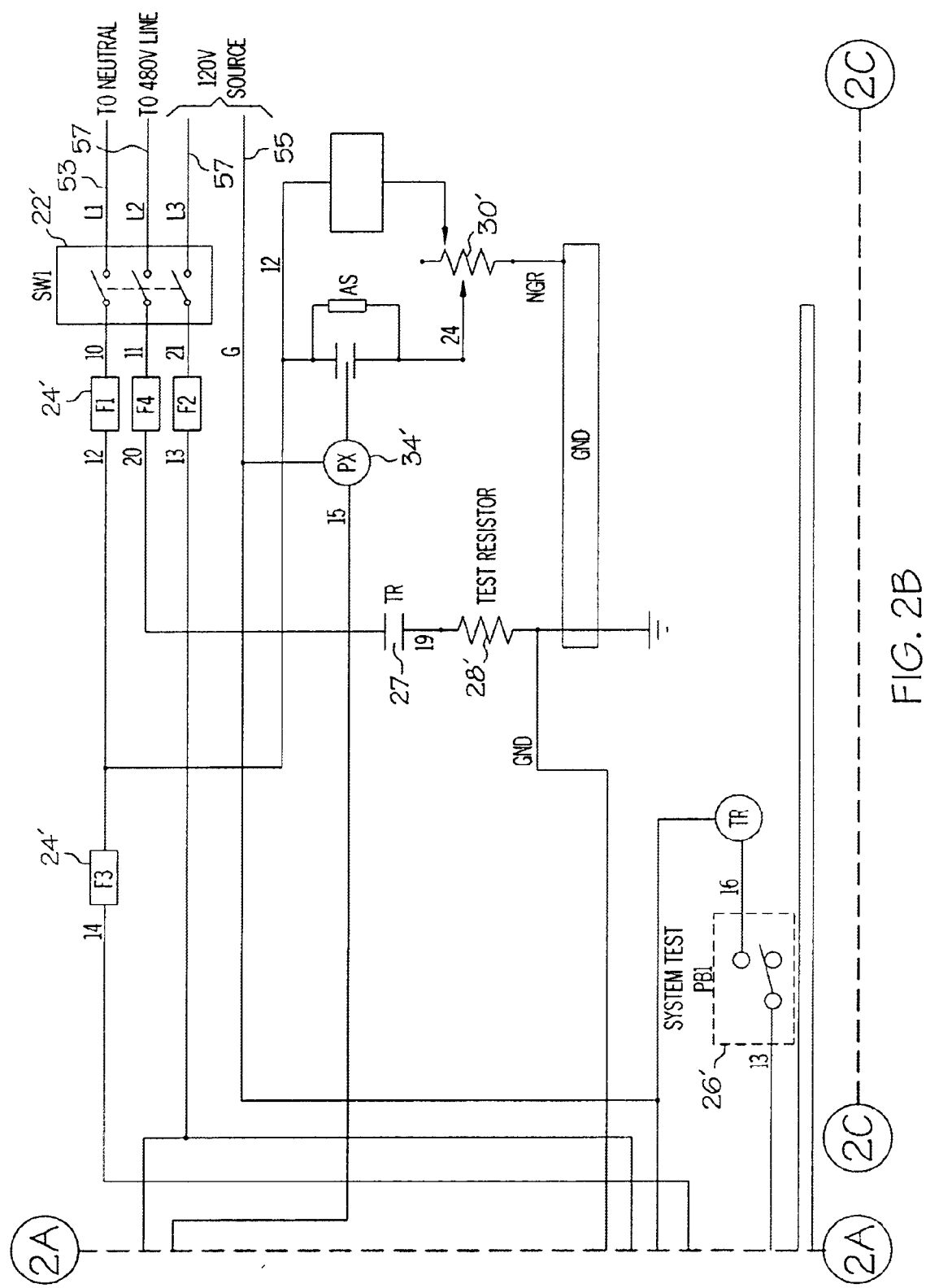
Figure 2C:
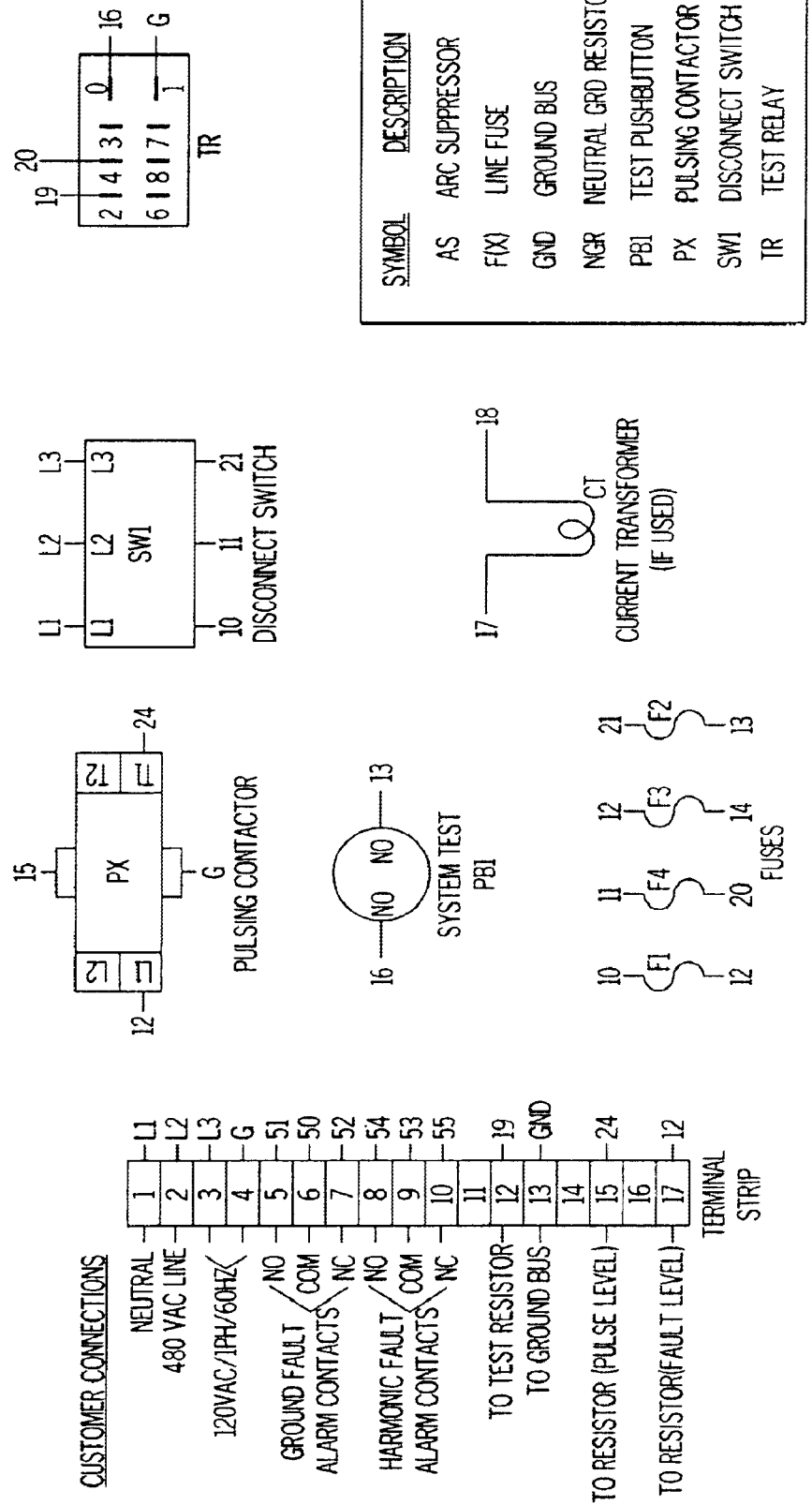

FIG. 2 is a circuit diagram of one exemplary circuitry embodiment of the exemplary detector of FIG. 1. In this exemplary embodiment, the electrical system monitored is a 480 volt system having a 480 volt phase conductor and a neutral conductor, which connect to the detector on lines 51 and 53 respectively. In addition, power for the detector 18' can also be provided on lines 55 and 57, and in this case comprises a 120 volt source. The lines 51, 53, and 57 can connect through a disconnect switch 22', to allow for ease in connecting and disconnecting the monitored system. Fuses 24' can also be provided and connected to the these lines 51, 53, and 57 to provide protection.

In this embodiment, the power module 32' includes input connections 50 which receive the neutral and ground connections of the monitored system, so as to determine the voltage across the neutral ground resistor 30' and/or to determine the current through the neutral ground resistor. While the voltage and current can be monitored, it is possible that either could be monitored in some embodiments. In this embodiment, the system 18' also provides neutral grounding of the neutral line 53 through a neutral grounding resistor 30'. Moreover, a test resistor 28' and test switch 27 can be placed in series between the monitored phase line 51 and ground. Pressing the system test button 26' causes the phase 51 to be connected to ground through the test resistor 28', thereby mimicking a ground fault condition for testing the detector system 18'. (Moreover, this button can then provide the phase voltage and current to the detector circuitry, allowing the harmonics of the phase to be checked for high conditions, as described below.) Input connections 52 are also provided on the power module 32' to provide power to the module 32'.

Output connections 54 can also be provided to allow for the indication of the conditions of the monitored electrical system. In this example, the power module 32' provides output connections to drive a system normal indicator to indicate that the electrical system is operating normally, output connections to drive a ground fault alarm to indicate that a ground fault has been detected, and output connections to drive a harmonic alarm to indicate that a high harmonic condition has been detected. Moreover, output connections can be provided to drive an external horn to indicate an audible ground fault condition. In addition, an output connection can be provided to provide a signal to silence that audible alarm when desired.

In addition, the output connections 54 can include pulse relay output connectors to drive a pulsing contactor 34' or other suitable switch. When a ground fault has been detected, the pulsing contactor can be utilized to provide current pulses into the monitored electrical system, and an ammeter can then be utilized to test various locations in the system. When the pulses are no longer detected by the ammeter, the location of the fault has been found.

In communication with the power module 32' is a digital operator interface (i.e., display) module 36'. The power module 32' and the operator interface module 36' can be connected by a suitable communication link or cable. The operator interface can include a digital processor, (such as a digital controller, programmable microprocessor, digital integrated circuitry, digital controller chips, and the like) which detects whether a ground fault has occurred by executing a program or algorithm which monitors directly or indirectly the voltage across and/or current through the neutral grounding resistor 30'. The processor can then provide an output when a ground fault is detected and this output can then drive the appropriate outputs 54 of the power module 32'. Moreover, the interface module 36' can include inputs and memory for programming and/or setting parameters to be utilized in the program executed by the processor. However, while the power module 32' and digital interface/display module 36' are shown as separate modules in this embodiment and as described herein, it should be understood that these modules can be integrated into a single module if desired, into integrated circuitry if desired, or into multiple modules if desired, and additional or alternative components, connections and circuitry are possible.

Figure 3:
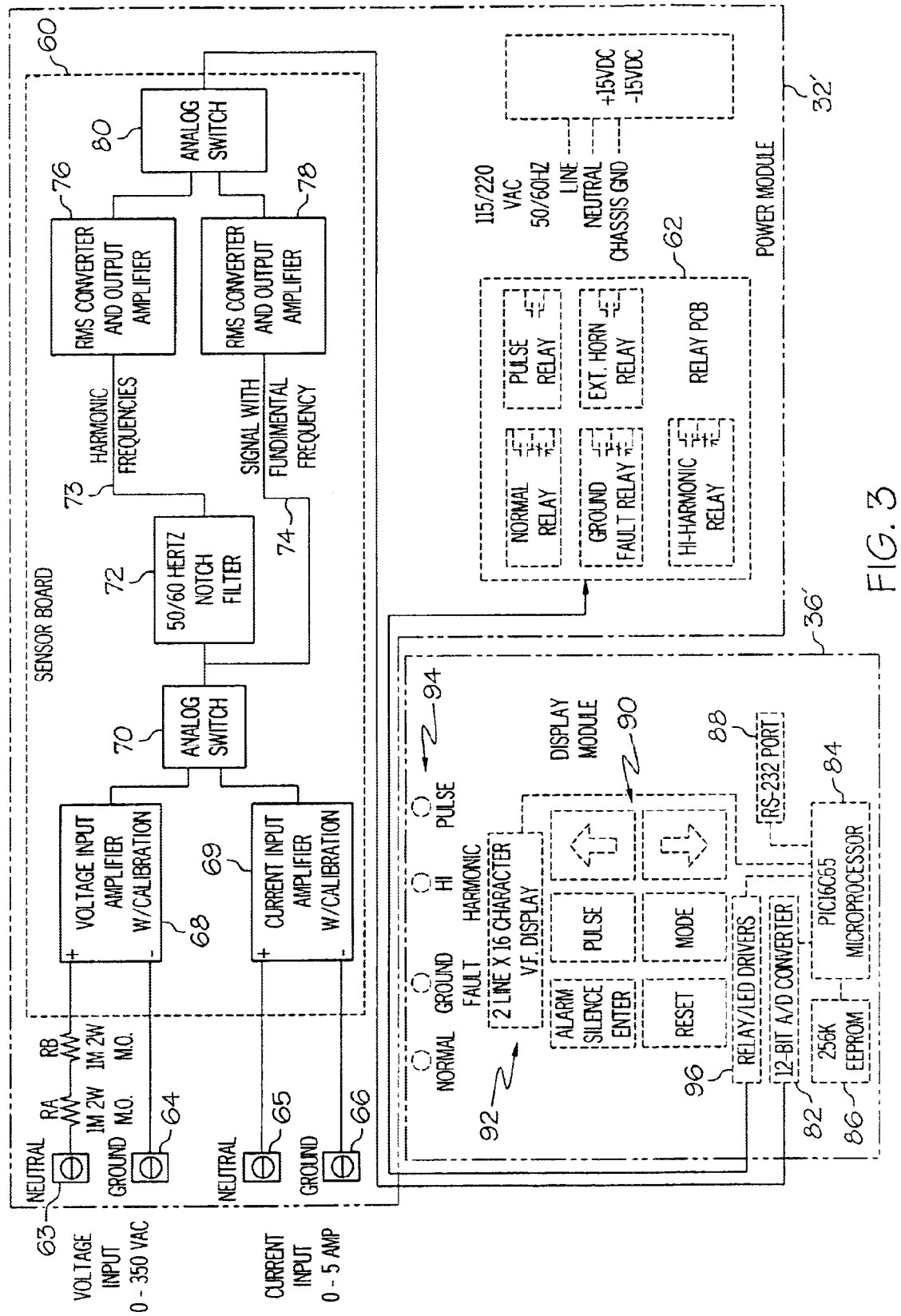
FIG. 3 is a block diagram illustrating exemplary components which can be utilized in the power module and the display module of the exemplary detector of FIG. 2.
Figure 4A:
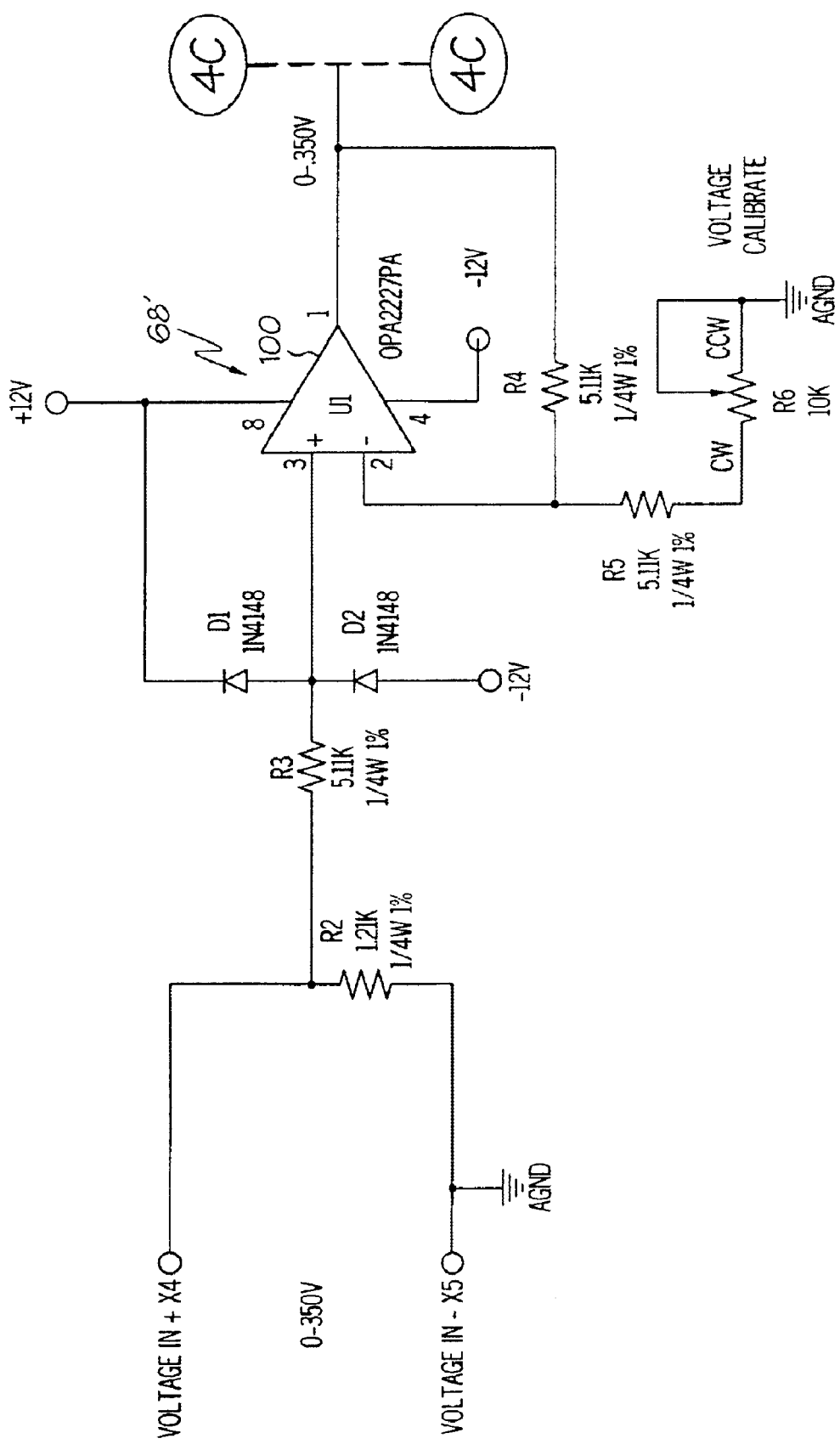
FIG. 4 is a circuit diagram illustrating exemplary circuit components which can be utilized in the calibration, switching, and filtering sections of the exemplary power module shown in FIG. 3.
Figure 4B:
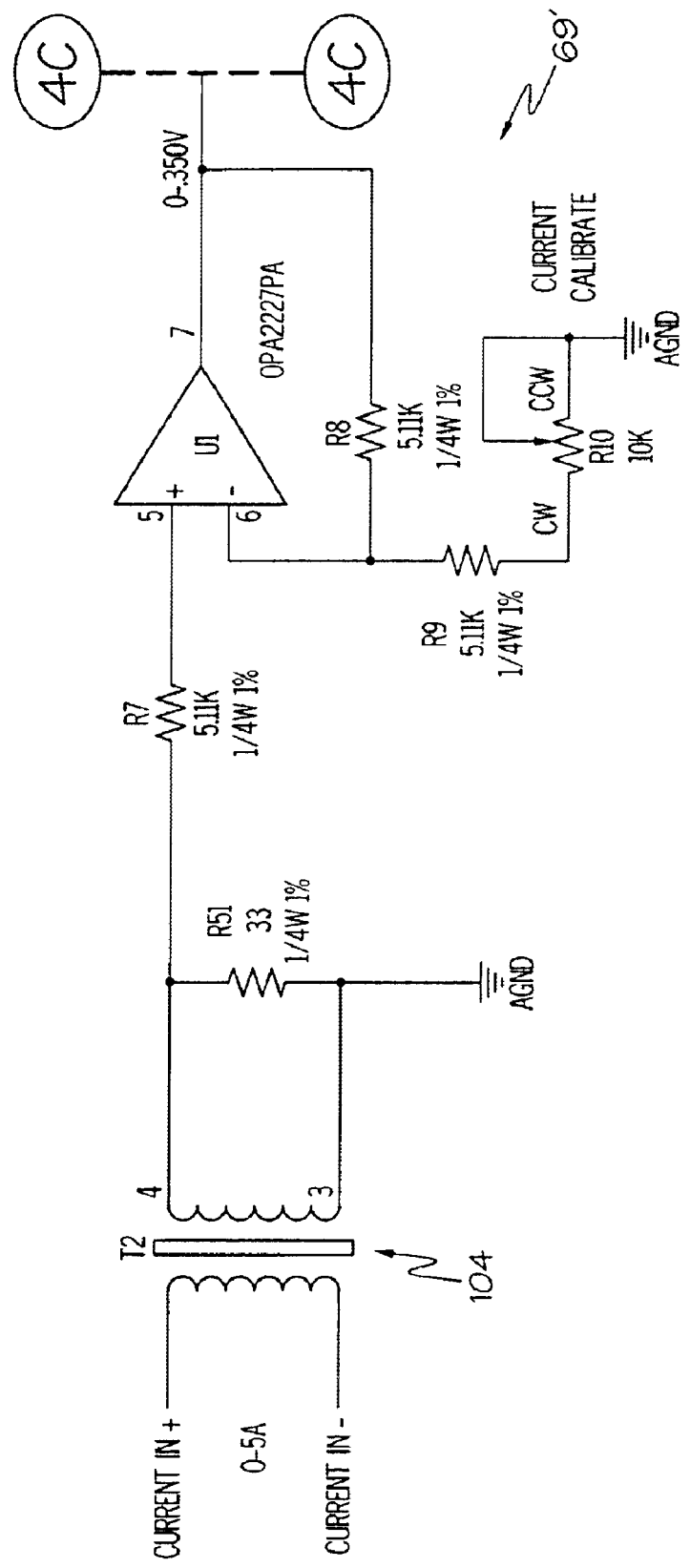
Figure 4C:
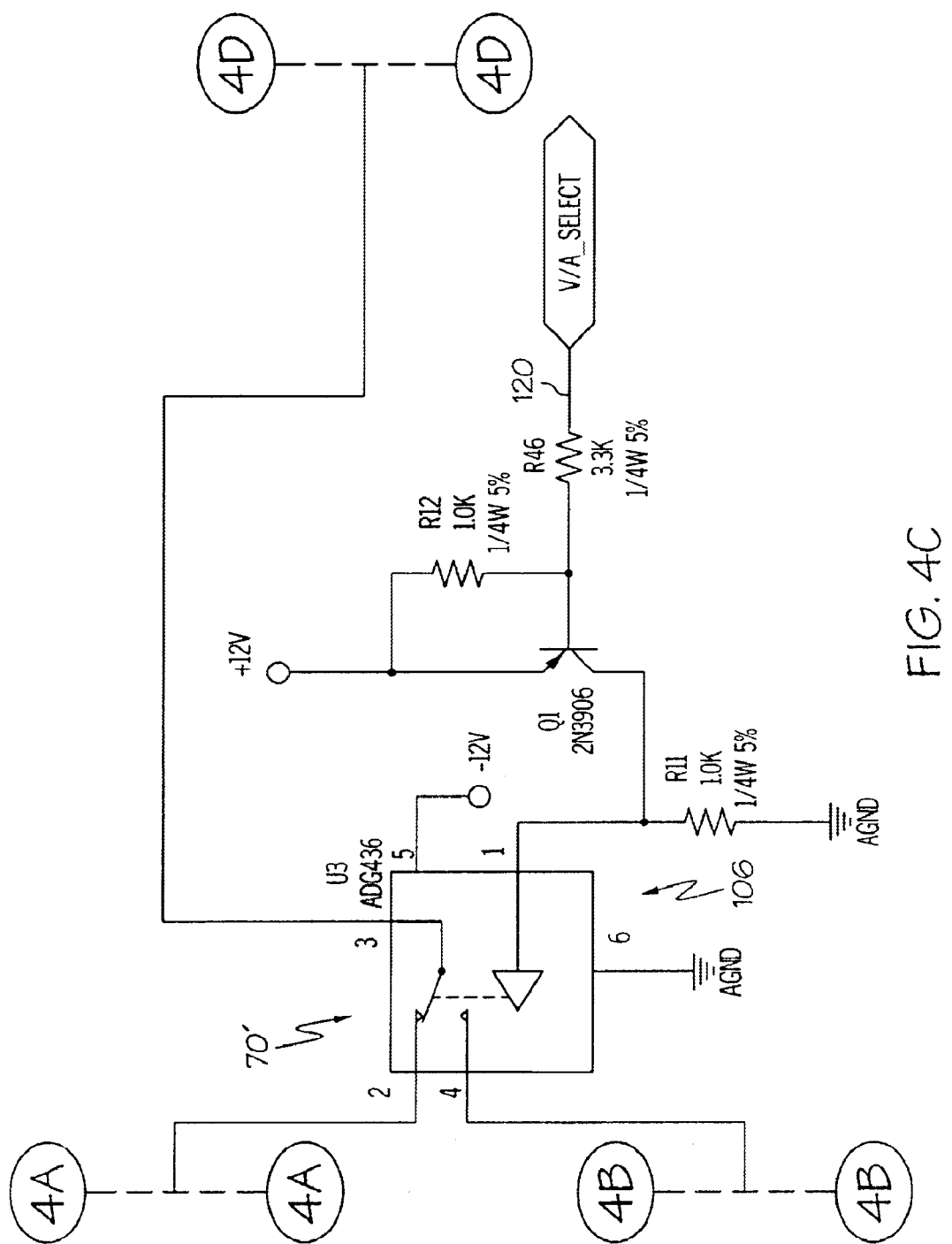
Figure 4D:
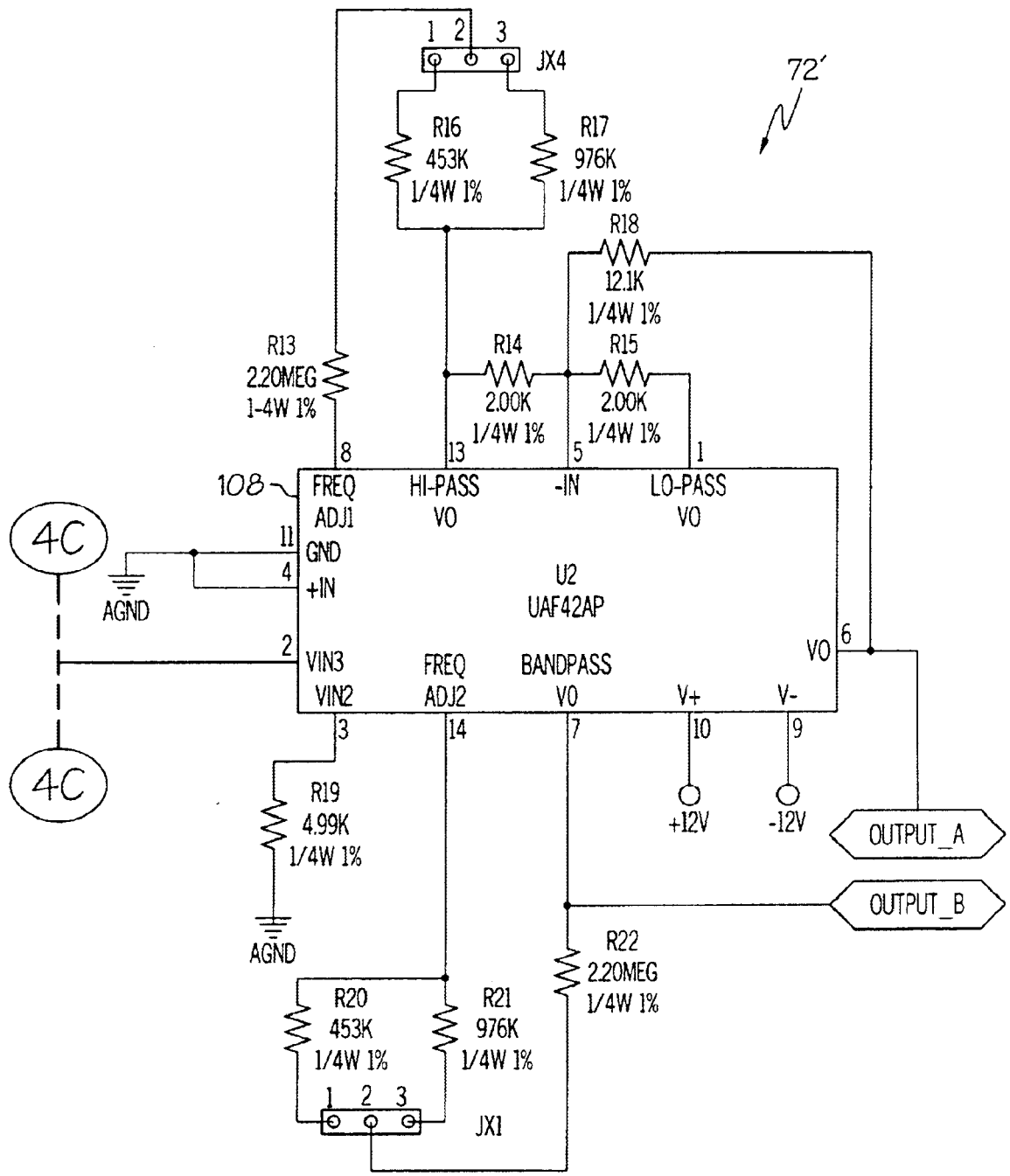

FIG. 3 is a block diagram illustrating exemplary components which can be utilized in the power module and the display module of the exemplary detector system of FIG. 2. In this example, the power module 32' includes a sensor circuit board 60 which conducts signal conditioning and filtering of the signal or signals to be monitored. In addition, a relay circuit board 62 can be provided to drive the output devices which are utilized to indicate an operating condition of the electrical system which is monitored. In communication with both the sensor board 60 and the relay board 62 is the display module 36' with its digital detection circuitry.

Exemplary components of the sensor board 60, relay board 62 and display module 36' will now be described in detail. In particular, as shown in FIG. 3, the neutral and ground voltage inputs are provided at connectors 63 and 64, and the neutral voltage input is connected through a pair of resistors RA and RB. In addition, the neutral and ground current inputs are provided at connectors 65 and 66. (However, in some embodiments, it may be desirable to monitor only the voltage parameter or the current parameter, in which case some of the components described herein for monitoring both can be eliminated.)

The voltage and current inputs can then be provided to amplifier/calibration circuits 68 and 69 to provide the voltages and current signals at desirable levels for monitoring and processing. For example, a potentiometer in the circuit 68 could be utilized to adjust the signal levels as desired. The voltage and current signals can then be provided to an analog switch 70, which can comprise, for example, a semiconductor switch which allows the circuitry to switch between the current and voltage when monitoring both of these parameters of the electrical system. If it is desirable to also monitor and/or filter harmonic frequencies from the current and voltage signals monitored, a notch filter 72 or other appropriate filter circuit can then be utilized to filter out the harmonic frequencies from the fundamental frequency of the signal monitored. In this instance, the filter 72 provides the harmonic frequencies on line 73, while the fundamental signal, including the fundamental frequency, is provided on line 74. (Although the entire signal can be monitored for ground faults, the filter 72 or an additional filter can be connected in series on line 74 to filter out the harmonics and provide only the fundamental frequency on line 74. In this manner, false alarms due to high harmonics in the signals can be minimized. Moreover, if high harmonic alarms are provided, such a configuration can allow the percentage of the harmonics to the fundamental component to be calculated and compared to a setpoint). Then, for each of the signals on lines 73 and 74, a converter circuit (76 and 78) can be provided to convert these signals to RMS (root-mean-square) signals, and also to provide additional amplification for output purposes. Another switch 80 can then be provided to allow for switching between the RMS signal of the harmonics and the RMS signal of the entire signal monitored (or of the fundamental component of this signal, if the harmonics are filtered to prevent false alarms). Thus, use of the two switches 70 and 80 allows for four possible outputs of the sensor board 60: the calibrated RMS representation of the voltage signal, the RMS representation of the harmonics of the voltage signal, the RMS representation of the current signal, and the RMS representation of the harmonics of the current signal. As the switches 70 and 80 switch, one of these four outputs is provided to the digital display/detection module 36'.

Turning now to the digital display module 36', this component in this exemplary embodiment includes an analog-to-digital converter circuit 82 which converts the received signals to digital signals for digital operations and processing. In particular, a digital processor 84, comprising a microprocessor in this example, is provided in the display module 36' to determine whether a ground fault and/or high harmonic condition have been detected in either the current or voltage signals. A memory unit 86, such as an electrically erasable programmable read only memory (EEPROM) for example, can be utilized to store settings and/or programs to be utilized by the processor 84 in determining whether a fault condition is present. In addition, a port or interface 88 can be provided to allow the processor 84 to be connected to other digital devices. In this example, the port is an RS-232 port, although many other communications options could be utilized.

Input buttons 90 can be provided on the module 36' to allow for the digital setting of the parameters and other features of the module. These buttons can be in communication with the processor 84 and can allow the user to modify the settings utilized by and features of the processor. The buttons 90 can include up and down scroll buttons, a mode button, a reset button, and an alarm silence button (which can serve as an Enter key as well during setup of parameters). In addition, if fault locator capabilities are desired, a pulse button can be utilized to initiate the locator signal (e.g., a pulsing signal). This signal can be provided constantly until another input is provided, such as the pressing of the pulse button again. The duty cycle of the pulses provided can be set at a predetermined level, or can be user definable by connecting the pulsing output through a user settable timer circuit.

Moreover, output components can be provided on the display module 36' which are controlled by the processor 84. In this example, the output components include indicators 94, such as light emitting diode (LED) indicators 94, for showing a normal condition of the monitored electrical system, a ground fault condition in the monitored electrical system, and a high harmonic condition in the monitored electrical system. Moreover, a pulse indicator can be provided to indicate when the locator switch has been activated for locating the ground fault in the system. In addition, a display 92 can be provided to display the various user settings and allow these settings to change as the user makes changes using the input buttons 90. In this example, the display 92 is a two line by 16 character display, although other displays could be utilized, such as liquid crystal displays for example.

The display module 36' also includes a relay and LED driver circuit 96. This circuit is driven by the processor outputs and provides the correct signal levels to drive the LED's 94 and to drive the associated relays 62 in the power module 32'.

FIG. 4 is a circuit diagram illustrating exemplary circuit components which can be utilized in the calibration, switching, and filtering sections of the exemplary power module shown in FIG. 3. In particular, an exemplary voltage input amplifier and calibration circuit 68' is shown for conditioning the neutral/ground voltage signal. In particular, in this example, an operational amplifier 100 is utilized in this circuit, which can comprise an OPA2227PA operational amplifier or other suitable model. Similarly, an operational amplifier 102 can be utilized in the current input amplifier and calibration circuit 69'. This amplifier 102 is connected through a resistor to a transformer 104 which adjusts the current inputs to appropriate levels. These circuits 68' and 69' can also include other electrical components, as shown in FIG. 4, although it should be understood that many other variations and alternatives are possible.

The analog switch circuit 70' can comprise a semiconductor switching device 106. In this example, an ADG436 is utilized, which is a CMOS analog switch. However, other switching and interfacing options and components can be utilized for receiving the current and voltage signals, if it is desired to receive both signals. Exemplary additional components for connecting such a switch are shown in FIG. 4.

As is further shown in FIG. 4, the filter circuit 72' can utilize any of a variety of filter circuits and devices. In this example, a UAF42AP universal active filter 108 is utilized, although use of other alternative devices is possible. An exemplary configuration for connecting the filter 108 to the circuit is shown in FIG. 4. Output A of the filter circuit 108 provides the harmonic components of the conditioned current or voltage signal (depending on status of switch 70') of the monitored electrical system. Accordingly, output A provides a harmonic current or voltage signal. However, output B provides a band pass filter of the fundamental frequency of the current or voltage.

Figure 5A:
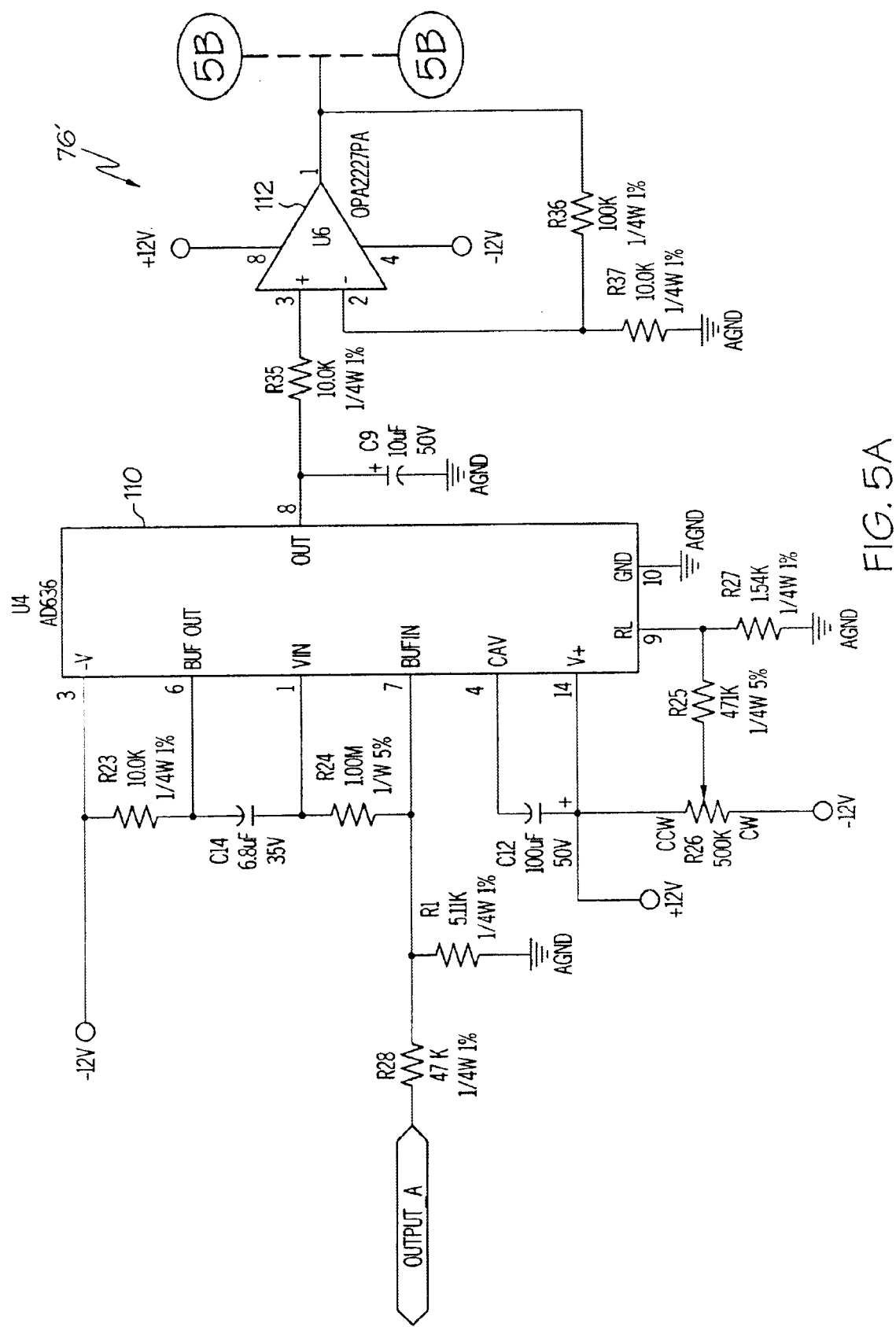
FIG. 5 is a circuit diagram illustrating exemplary circuit components which can be utilized in the RMS conversion section and harmonic switching section of the exemplary power module shown in FIG. 3.
Figure 5B:
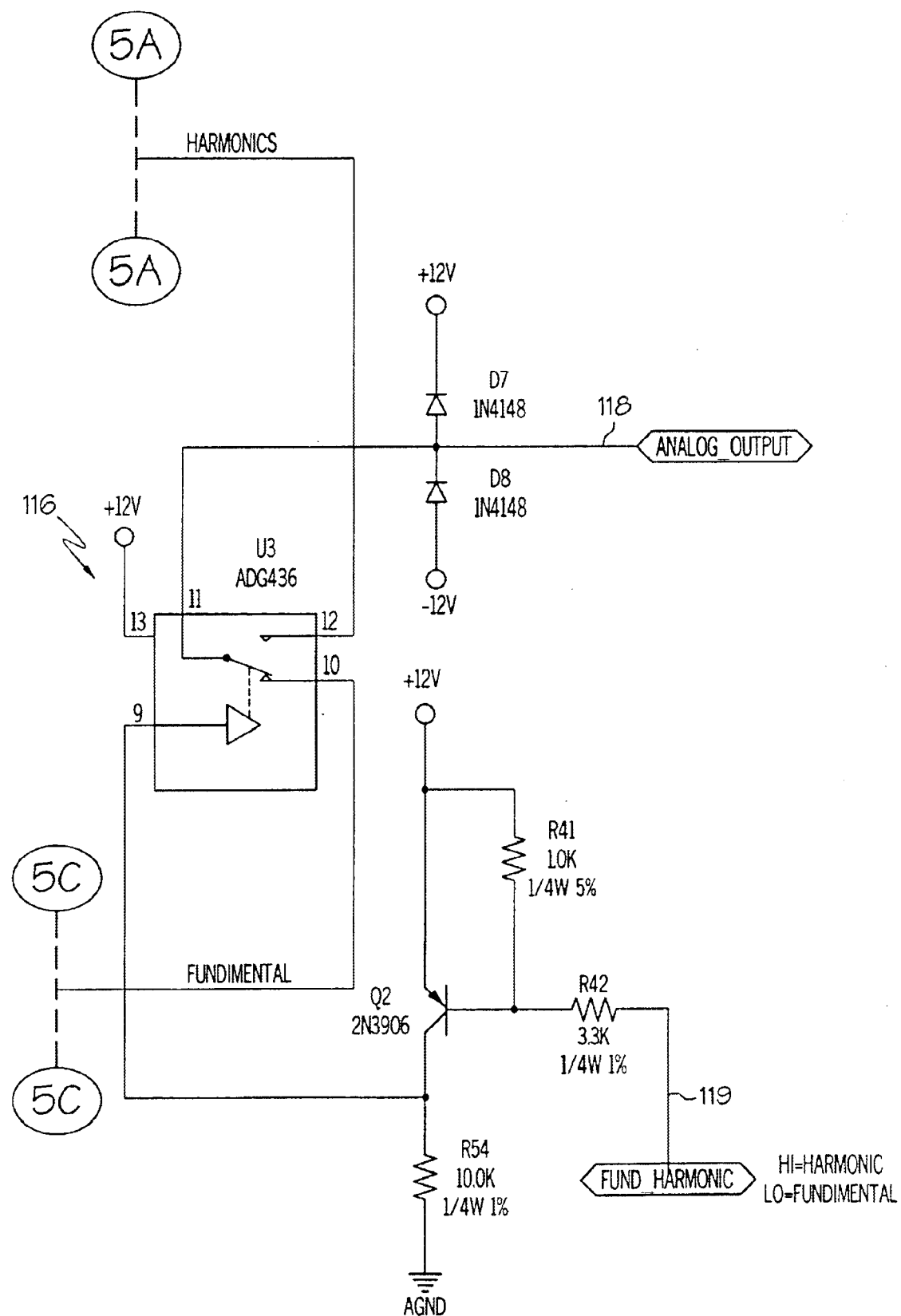
Figure 5C:
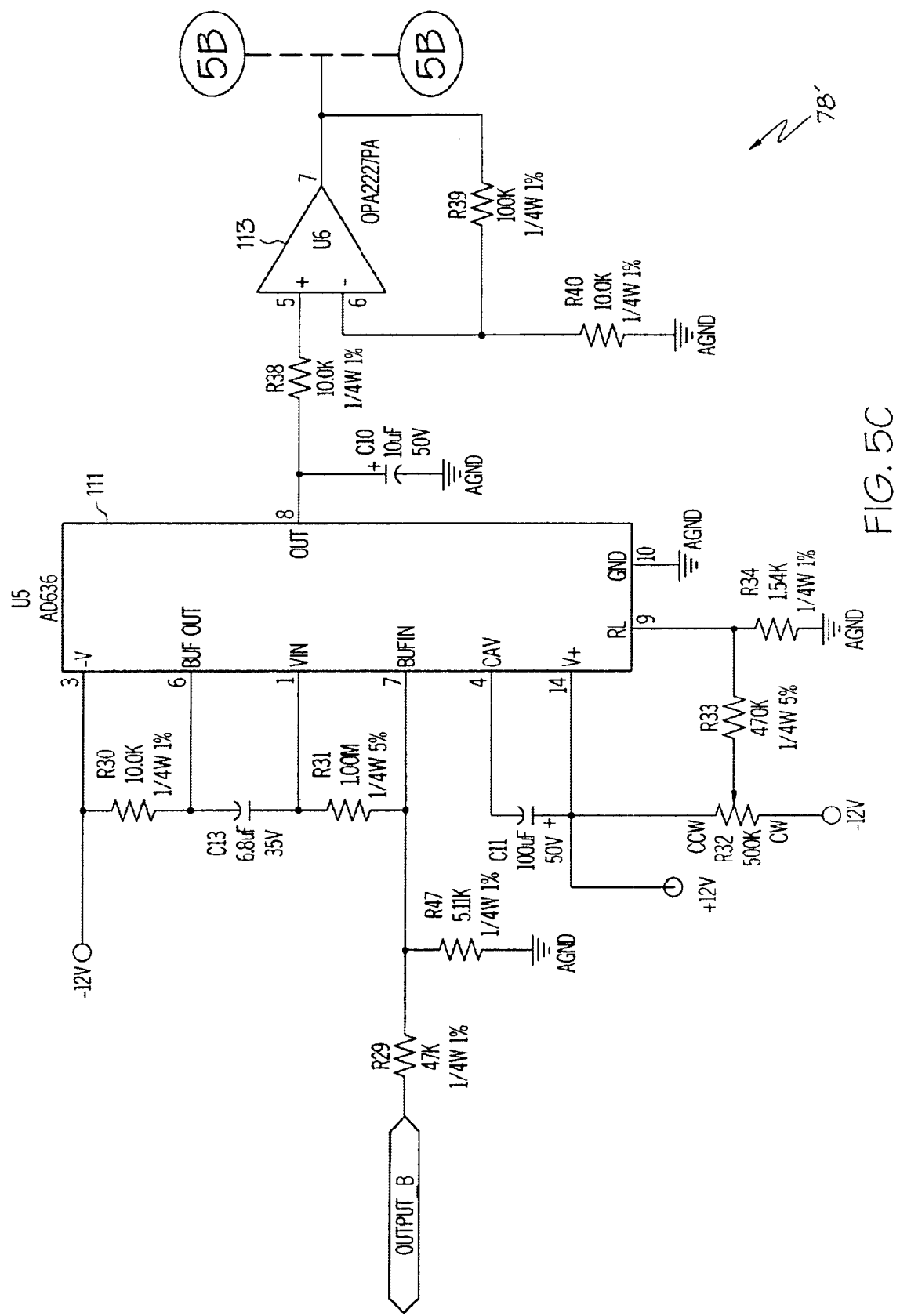
Figure 6A:
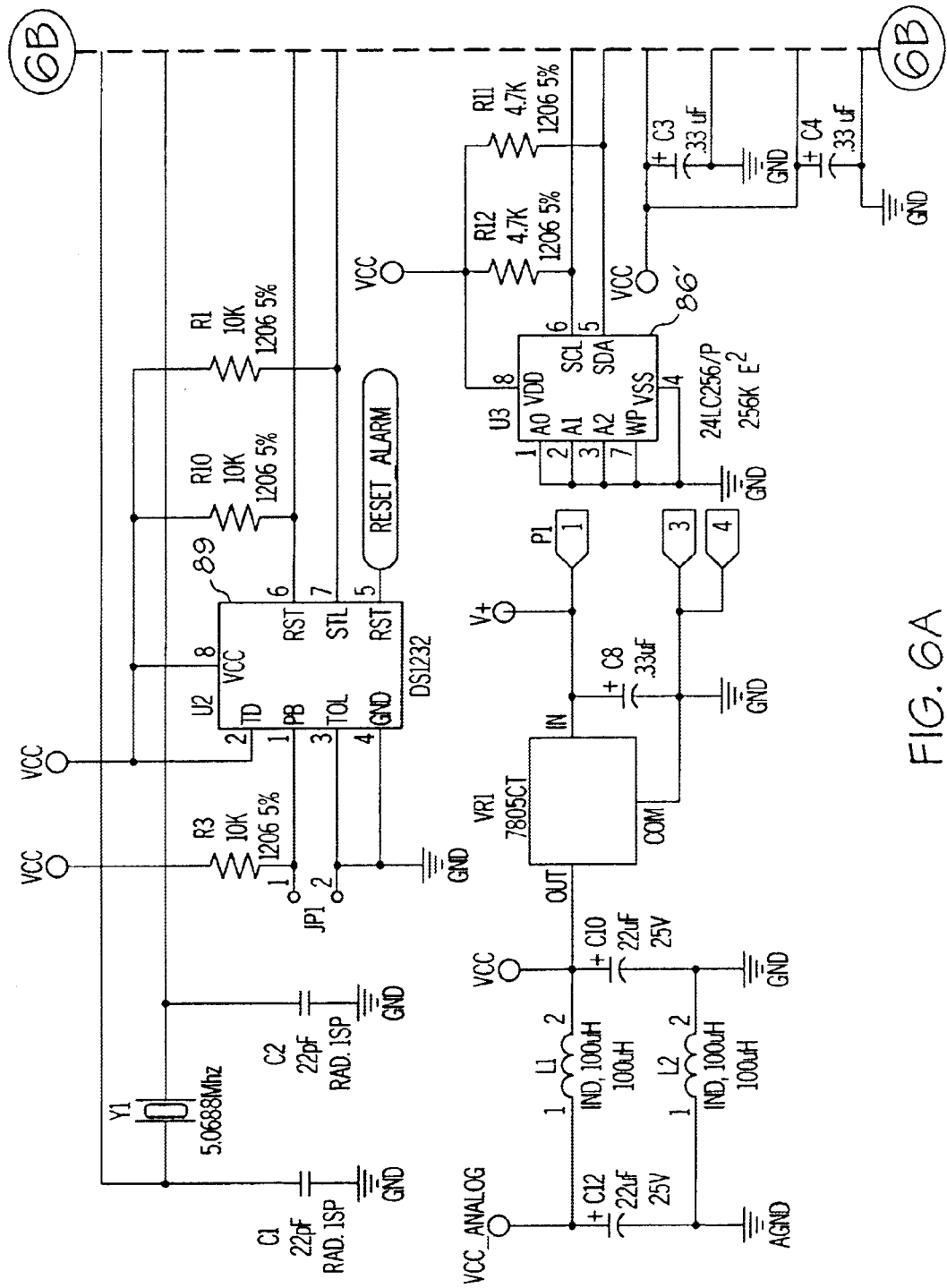
FIG. 6 is a circuit diagram illustrating exemplary circuit components which can be utilized in the exemplary display module shown in FIG. 3.
Figure 6B:
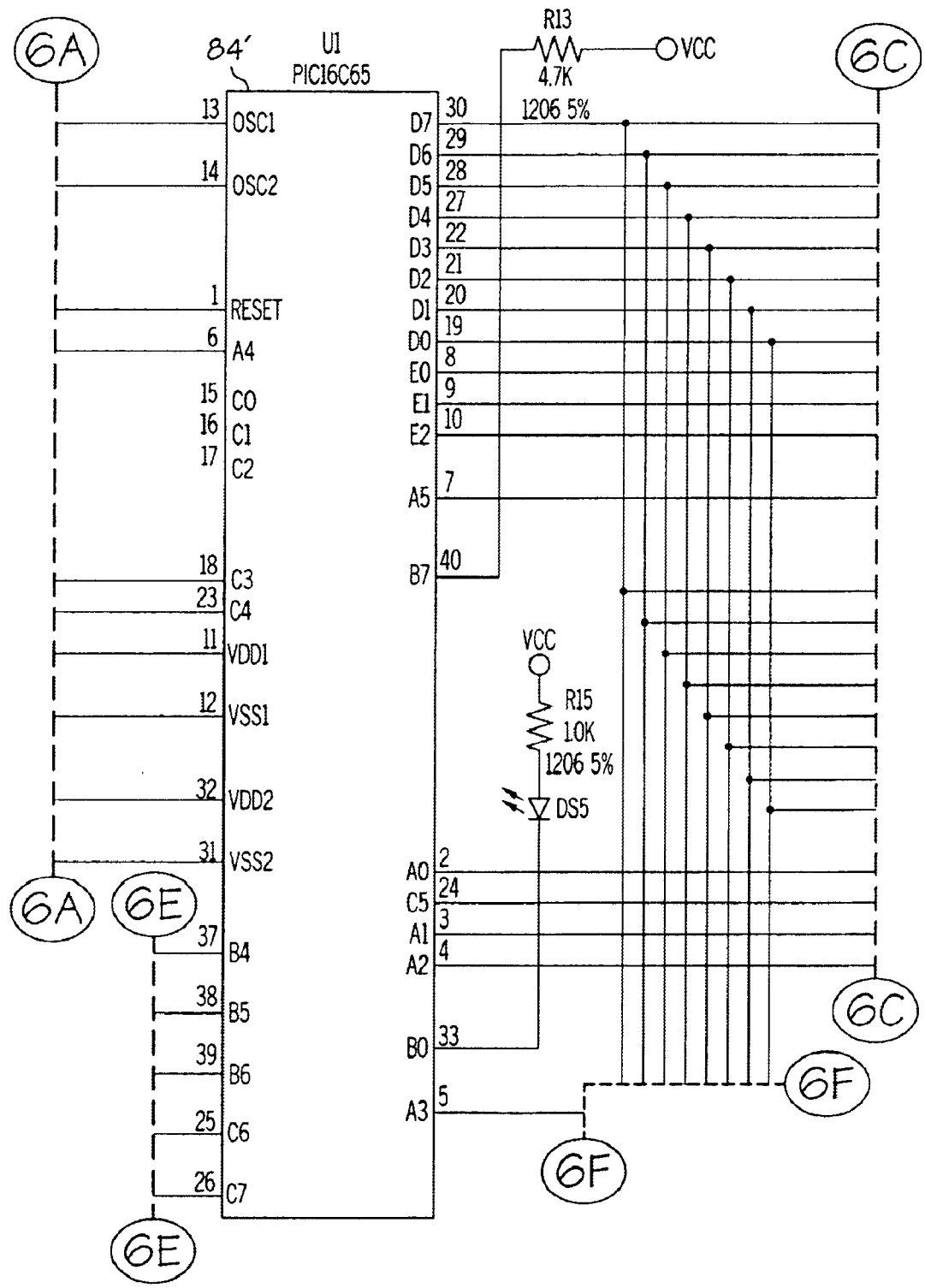
Figure 6C:
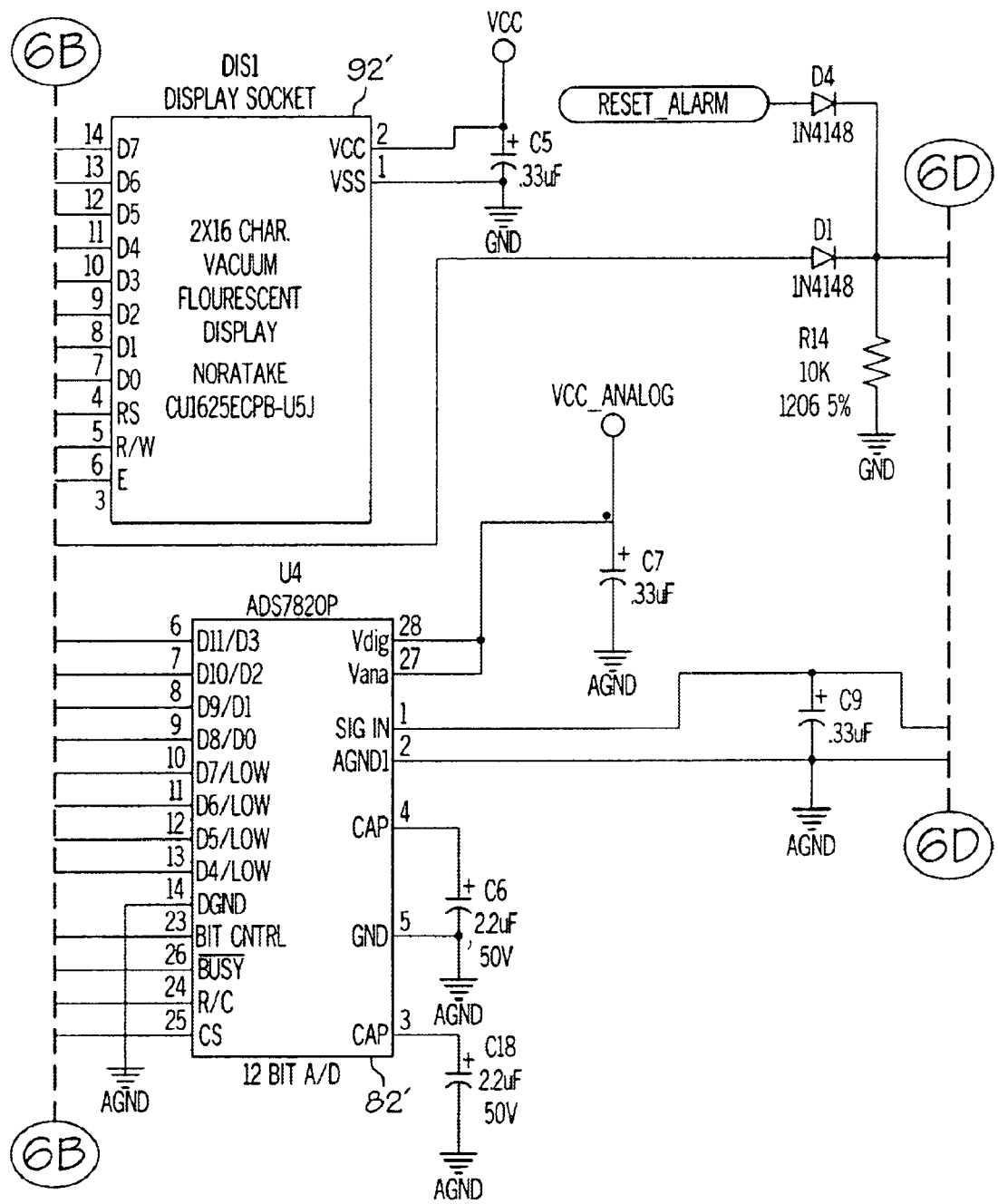
Figure 6D:
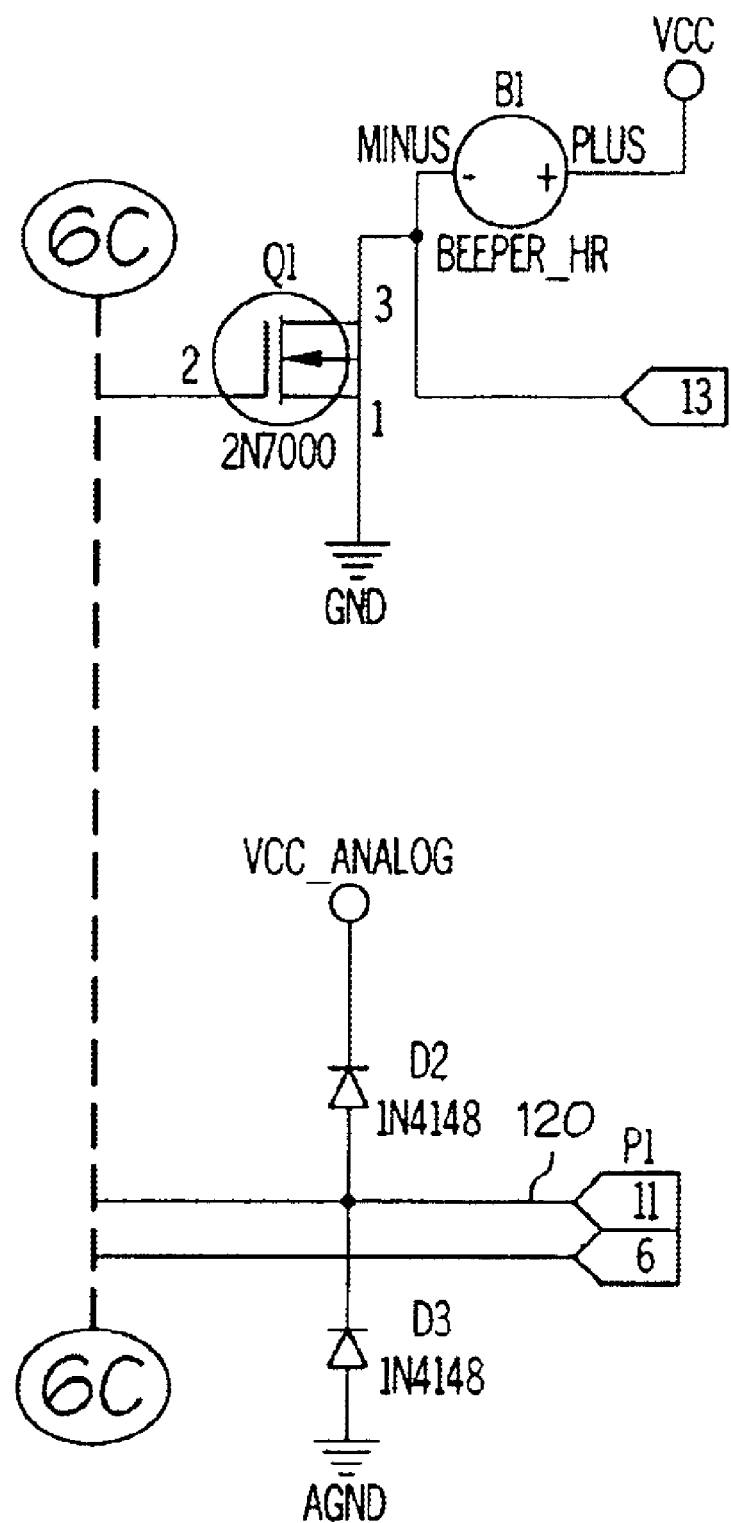
Figure 6E:
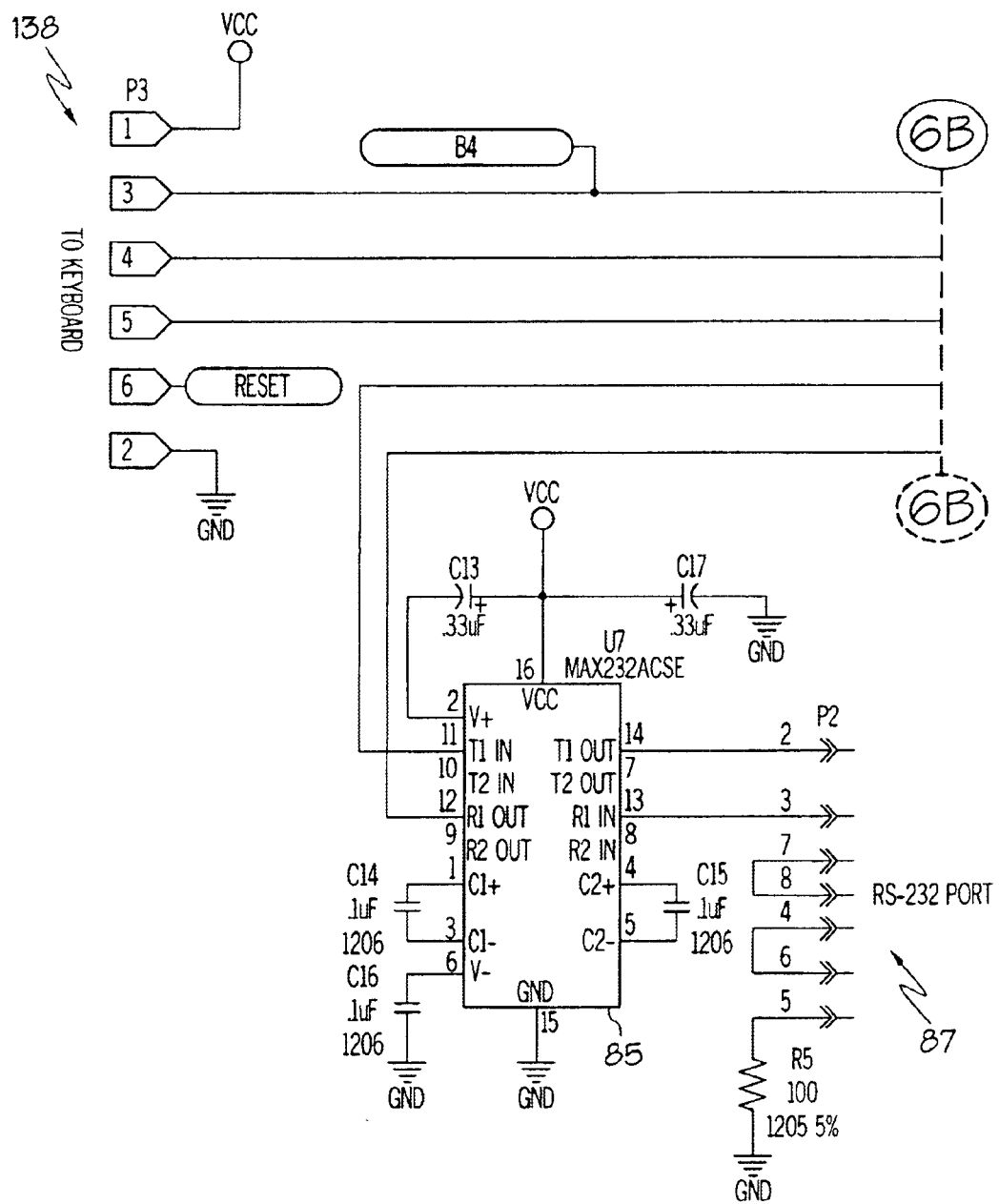
Figure 6F:
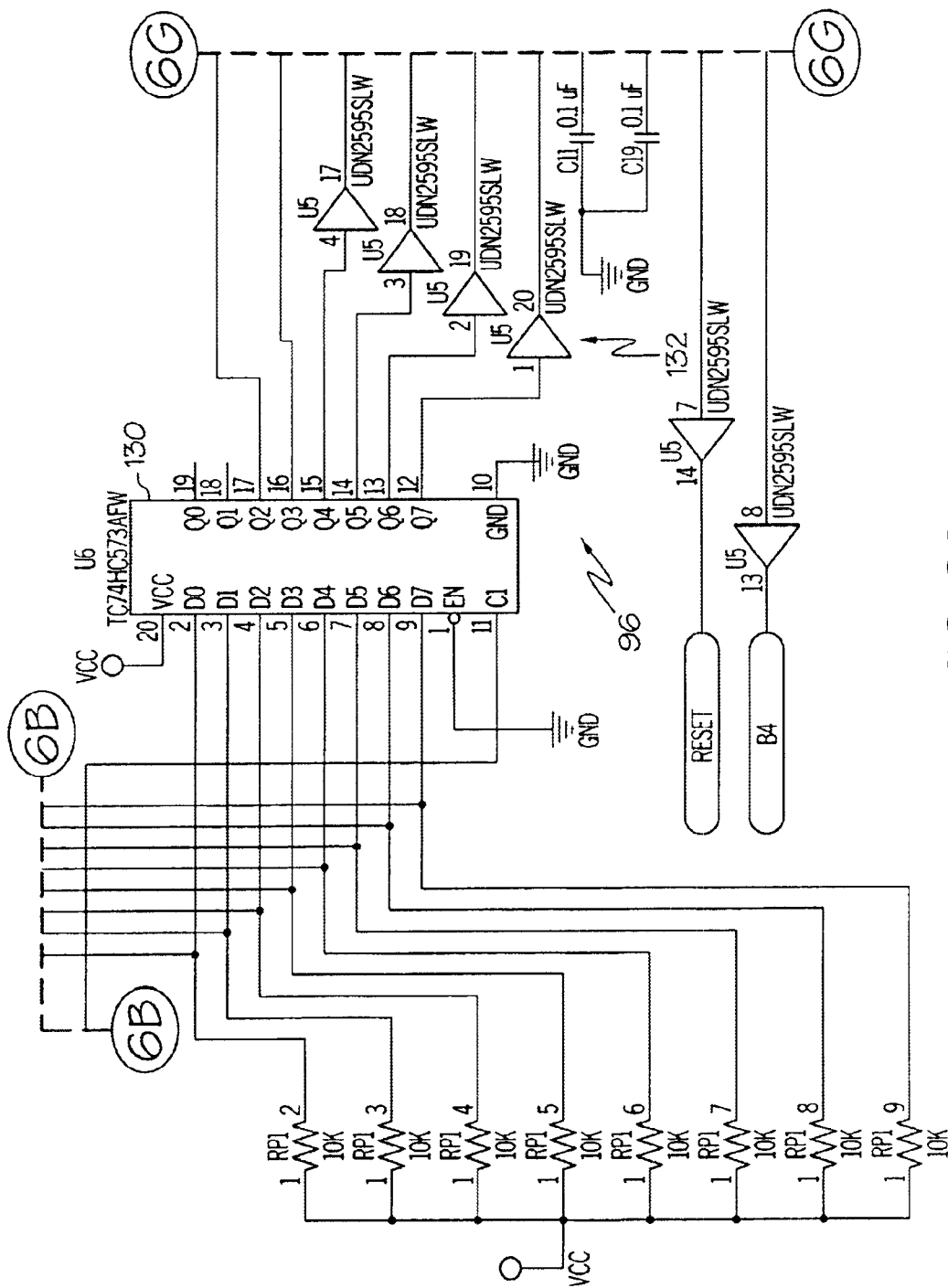
Figure 6G:
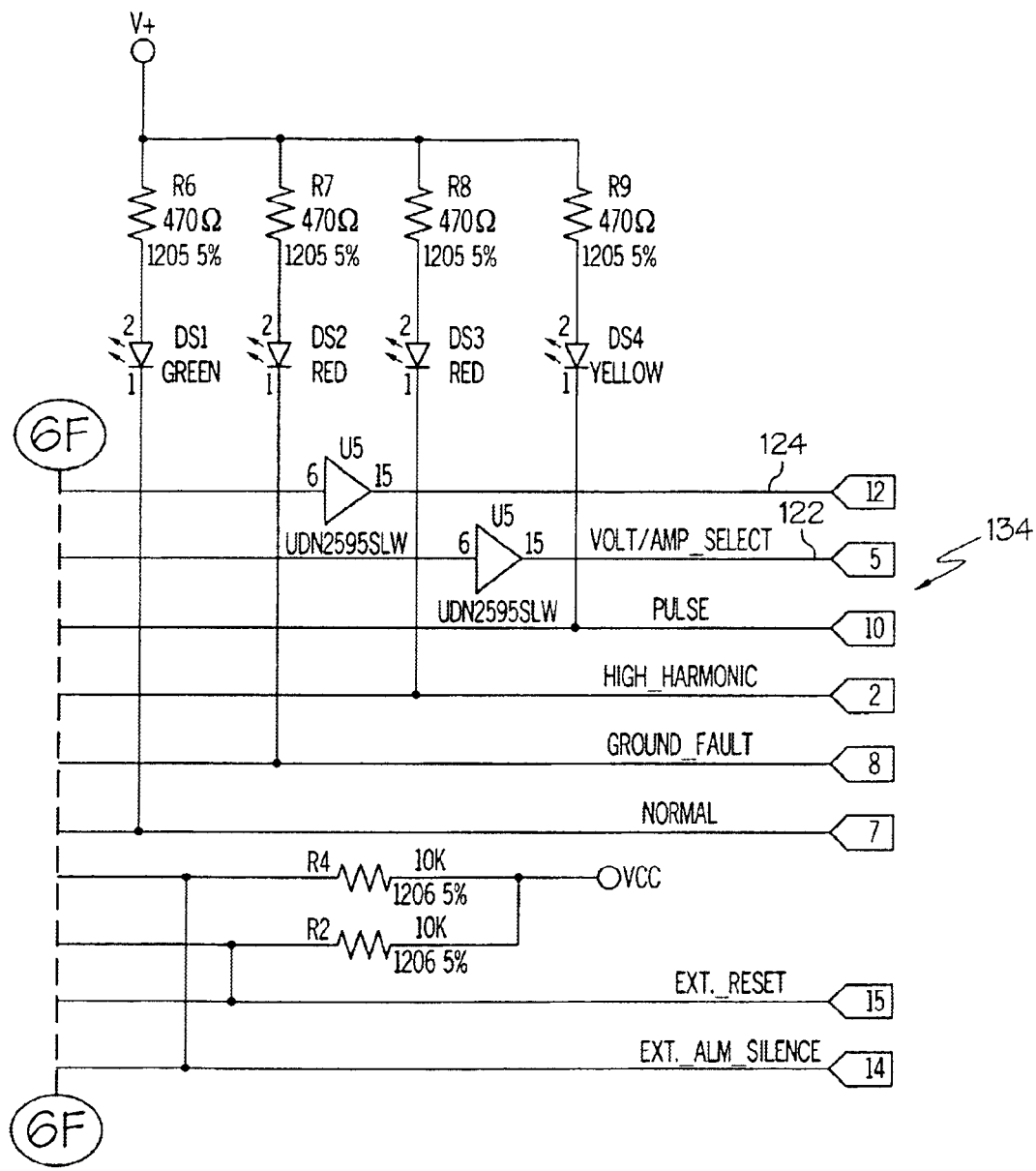

FIG. 5 is a circuit diagram illustrating exemplary circuit components which can be utilized in the RMS conversion section and harmonic switching section of the exemplary power module shown in FIG. 3. In this example, each of the converter/amplifier circuits 76' and 78' include AD636 integrated circuits 110/111 which perform RMS to DC conversion to provide a DC value indicating the RMS value of the signals received from the filter 72' of FIG. 4. In particular, converter circuit 110 receives the harmonic components of the current or voltage signal from the filter 72' and provides a DC output indicative of the RMS value of that signal. Likewise, the converter circuit 111 receives the fundamental current or voltage signal and provides a DC output indicative of the RMS value of that signal. FIG. 5 further shows exemplary components for connecting such a converter circuit 110 and 111, although other connections, configurations and components are possible.

These DC signals from the converters 110 and 111 can then be supplied to amplifier circuits for providing the DC signals at appropriate levels for use and processing in the digital display module 36'. In this example, a pair of OPA2227PA operational amplifiers 112 and 113 are utilized, with exemplary connections and components being shown in FIG. 5. A switching circuit 116 is then provided to switch between the RMS DC voltage or current signal and the harmonic RMS DC voltage or current signal. In this example, the switching circuit is again a ADG436 CMOS analog switch. Thus, the switch 116 switches between the these two signals and provides either on output line 118 (which connects to diodes D7 and D8 in this example). The switch 106 of FIG. 4 likewise switches between current and voltage input signals. These two switches 106 and 116 are operated in this example under the control of the processor 84 of FIG. 3. For instance, in FIG. 5, the processor provides a digital selection signal on the input line 119 to set the switch 116 into the desired position. Likewise, with respect to FIG. 4, the processor provides a digital selection signal on line 120 to set the switch 106 into the desired position. Thus, the processor 84 can provide signals which set the switches 106 and 116 into the desired position such that one of the following four signals is received at the output 118 of FIG. 5 (which then is provided as an input to the processor): 1) an RMS representation of the input current signal (the current flowing through the neutral grounding resistor); 2) an RMS representation of the input voltage signal (the voltage across the neutral grounding resistor); 3) an RMS representation of the harmonic components of the input current signal; and 4) an RMS representation of the harmonic components of the input voltage signal. However, other alternatives are possible. For instance, rather than switching the input signals to the processor, a processor could be provided which is capable of receiving all the input signals and conducting multi-tasked or selective processing of the various signals received.

FIG. 6 is a circuit diagram illustrating exemplary circuit components which can be utilized in the exemplary display module shown in FIG. 3. In this example, the output from the power module (i.e., line 118 of FIG. 5) is received at line 120. This signal can then be provided to an analog-to-digital converter 82', which in this example comprises an ADS7820P analog-to-digital converter, although many other conversion circuits and devices could be utilized for this purpose.

The digitized input signal is then ready for digital processing, manipulation, testing, communication, and/or storage. Accordingly, the signal can then be provided to a processor 84', which in this example comprises a PIC16C65 microprocessor, although the processor could comprise many other digital controllers, digital integrated circuits, digital chips, digital signal processors, and/or digital circuitry. The microprocessor 84' can execute a program, such as an algorithm or set of instructions for example. This program can be stored as software or firmware which can be executed by the processor or which can be otherwise configured to run on the processor. As described in further detail below, the program can compare the input signals received to predetermined set values to determine if a fault or alarm condition is present. If the input signal switches between four values as described in the example above (i.e., between current, voltage, harmonic current, harmonic voltage), then the processor 84' can compare each of these input values (in digital form via the converter 82') to a corresponding stored setpoint for the value. If the setpoint is exceeded then an alarm may be indicated by the processor 84'. If multiple inputs are utilized and tested, the processor may select which input to receive by controlling switches. For example, output line 122 could provide an output signal which controls a switch (e.g., switch 70' of FIG. 4) which selects whether the voltage or current signal of the monitored neutral-grounded electrical system is received. Likewise, output line 124 could provide an output signal which controls a switch (e.g., switch 116 of FIG. 5) which selects whether the harmonic portion or fundamental current or voltage signal is received.

Memory 86' can be utilized for storage of the parameters and/or program upon which the processor 84' operates. In this example, the memory 86' comprises a 256 kilobyte electrically erasable programmable read only memory, although other volatile and nonvolatile memory devices and/or memory chips could be utilized.

To drive the output devices (e.g., lights, indicators, displays, and/or audible alarms) and any relays or switches corresponding to the output devices, suitable driver circuitry 96' can be utilized. In this exemplary embodiment, the processor 84' provides a signal to a latch circuit 130 to select which output device(s) should be driven. In this example, the latch circuit 130 comprises a TC74HC573AFW integrated circuit, although many other circuits and devices could be utilized for this purpose. Digital power buffers 132 can then be utilized to provide a suitable current level for driving the selected output device(s). In this example, output lines 134 are provided to relays to switch the output devices. For example, if a pulse button is pressed, the processor 84' can light a Pulse indicator via the driver circuitry 96' to indicate that the monitored system is being pulsed with a locator signal to locate the fault. Likewise, if the processor 84' determines that a ground fault has occurred, then a Ground Fault indicator can be lit via the circuitry 96'. Similarly, if no fault is detected, a Normal indicator can be lit, and if a high harmonic level is detected, a High Harmonic indicator can be lit.

If desired, components can be provided to allow the user to view and change settings which are utilized by the processor 84' in determining whether a ground fault and/or harmonic fault have occurred. In particular, inputs 138 can be provided which connect to the processor 84' and allow input devices, such as keys, buttons, touchscreen devices, and the like, to provide input signals to the processor 84' to program the processor and/or change its settings. In this embodiment, the inputs 138 can connect to the buttons 90 of FIG. 3 to provide this inputting capability.

In addition, a display 92' can be provided and connected to the processor 84' for display of information regarding the programmable functions. In this example, the display is a 2 line by 16 character vacuum fluorescent display, although many other display devices could be utilized.

Furthermore, digital communication circuitry can be provided for connecting the processor 84' with other digital devices, such as to communicate signal levels, settings, programs and the like to a computer. In this example, a MAX232ACSE circuit 85 is provided as a line driver for the serial communication port 87. In addition, a monitor circuit 89 can be provided to monitor the processor 84' and to allow the processor to be re-set when needed.

An illustrative configuration is shown in FIG. 6 for connecting the various components of the exemplary display module. Moreover, FIG. 6 also shows other exemplary electrical components and circuitry which can be utilized in such an embodiment. However, it should be understood that many other configurations, components and circuits could be utilized, and that the embodiments herein are shown and described solely for the purposes of example and illustration.

Figure 7:
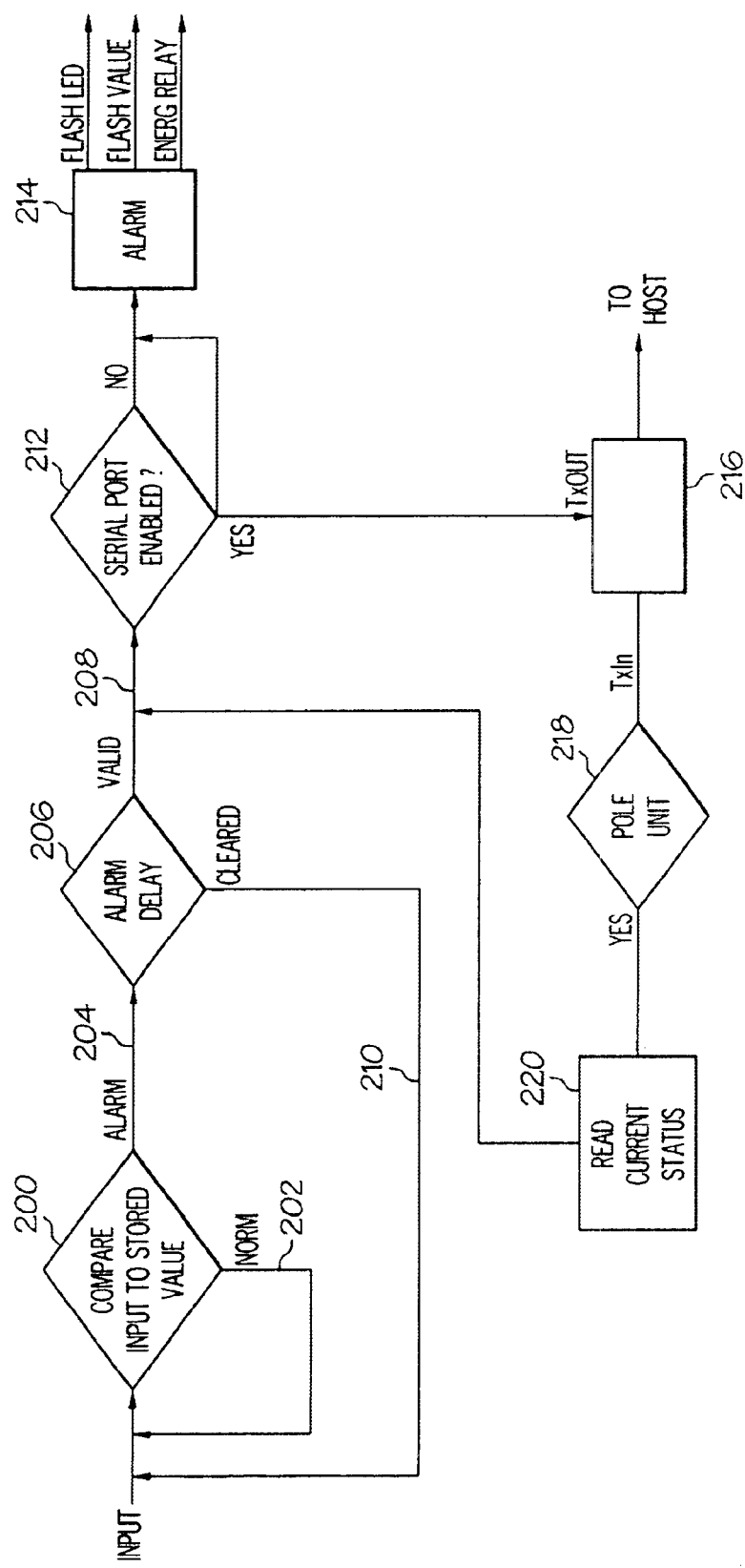
FIG. 7 is a flow diagram illustrating an exemplary program which can be executed by the exemplary processor of FIG. 6, to determine if an alarm condition is present on the monitored electrical system.

FIG. 7 is a flow diagram illustrating the operation of an exemplary program which can be executed by the exemplary processor of FIG. 6, to determine if an alarm condition is present on the monitored electrical system. As shown in FIG. 7, the input is received by the program. This input can be the monitored neutral current, the monitored neutral-to-ground voltage, the harmonic components of the monitored neutral current, and/or the harmonic components of the monitored neutral-to-ground voltage. Other alternative or additional parameters of the monitored electrical system can also be received. If multiple parameters are monitored, the processor may switch between the parameters, such as described above, or the processor may receive all the parameters at once but conduct multiple processes or routines for determining if the parameter is in an alarm state.

In the example of FIG. 7, the parameter of interest is compared to a stored setpoint value, as shown at decision block 200. If the parameter does not fall outside the boundary or boundaries defined by the stored setpoint, then the process returns to the start, as shown at line 202. However, if the parameter does fall outside of the boundary, then the process continues and prepares to indicate an alarm condition, as shown at line 204.

In particular, at block 206, an alarm delay timer can be started once an alarm condition has been determined. If desired, the amount of time utilized by this timing block 206 can be user-definable, such as by using the input buttons described above. If the timer completes its counting and the input parameter still exceeds the stored value, then the process continues on line 208 to indicate an alarm. Otherwise, no alarm is indicated and the process returns to the start, as shown by line 210. In this manner, an alarm will not be indicated unless the alarm condition exists for the predetermined amount of time, to ensure that the alarm is valid and not a transient event.

The alarm can be indicated in a number of ways. In the example of FIG. 7, the alarm signal can be transmitted to another device, if desired, or the alarm signal can drive an indicator, display, and/or relay. In particular, in this exemplary process, at block 212 it is determined whether the communication port (e.g., a serial communication port) is enabled. If not, then the alarm is indicated at block 214 by flashing an LED indicator, indicating the input parameter value on the display, and energizing a relay.

However, if the communication port has been enabled, then the alarm signal can be communicated to an auxiliary digital device, such as a computer for example. This possibility is shown at block 216 of FIG. 7. A signal is provided at this block to communicate the alarm condition and/or the value of the input parameter which is in an alarm state, and these may be displayed at the auxiliary device. In addition, if the communication port has been enabled, the auxiliary device may obtain data from the ground fault detector system. These steps are shown at blocks 218 and 220. In particular, if it is determined to obtain the data, the auxiliary device may read the current status of the monitored parameter from the detector. For example, a request for the current status can be communicated by an auxiliary digital device over the digital communication link, and the digital processor in the detector can respond with the requested status via the same port. Information such as the level of the monitored parameter, the type of parameter, the time of the occurrence, other parameters monitored, and any other desirable information related to the alarm event can then be recorded and stored (i.e., logged). Thus, if the alarm condition ceases before it can be fully investigated, a record of the event is kept. Accordingly, the user can use the stored data to investigate the cause of the event, such as by determining what operations, equipment, and/or processes were operated at the time that the event occurred. Trends can also be identified based upon this logged data to assist in determining the cause of the event.

FIG. 8 (starting at FIG. 8A and continuing through FIG. 8F) illustrates an exemplary process which can be utilized to display and input parameters to be utilized by the exemplary ground fault detector processor of FIG. 6. In this example, power is applied to the detector at block 230. Then, upon power up, the various monitored parameters are received by the processor and then displayed. In this example, the processor displays on the display device the neutral to ground voltage, the neutral current, the harmonic components of the neutral-to-ground voltage, and the harmonic components of the neutral voltage of the high resistance grounded electrical system. In addition, for systems which conduct harmonic monitoring, the levels of the harmonic component can be indicated, such as be indicating an absolute value or by indicating the percentage of the harmonic components to the fundament component. This step is shown at block 232.

Then, the user decides whether to change the alarm limit settings to be utilized by the digital processor, and to control the operation of the processor. This step is shown at block 234. If not, then the process returns to block 232. If a change is desired, then the user selects appropriate input buttons to indicate that a change in the parameters is desired. This step is shown at block 236.

In response to this selection, the processor displays the present stored setting of the high neutral-to-ground voltage limit, as shown at block 238. This value, as with the other values described herein, can be an absolute value, or a percentage of allowable distortion, or other desirable unit. If the value is OK, then the user selects an input, such as the Mode button of FIG. 3, to view and/or change the next parameter. If the N-G (neutral to ground) voltage parameter needs to be changed, then the user selects the appropriate buttons, such as the Up and Down arrow buttons of FIG. 3, to change the set value incrementally. Once the user is finished changing the N-G voltage parameter, the next parameter can be viewed and changed, such as by hitting the Enter button for example. These steps are shown at blocks 240, 242, 244, and 246 of FIG. 8A.

Figure 8A:
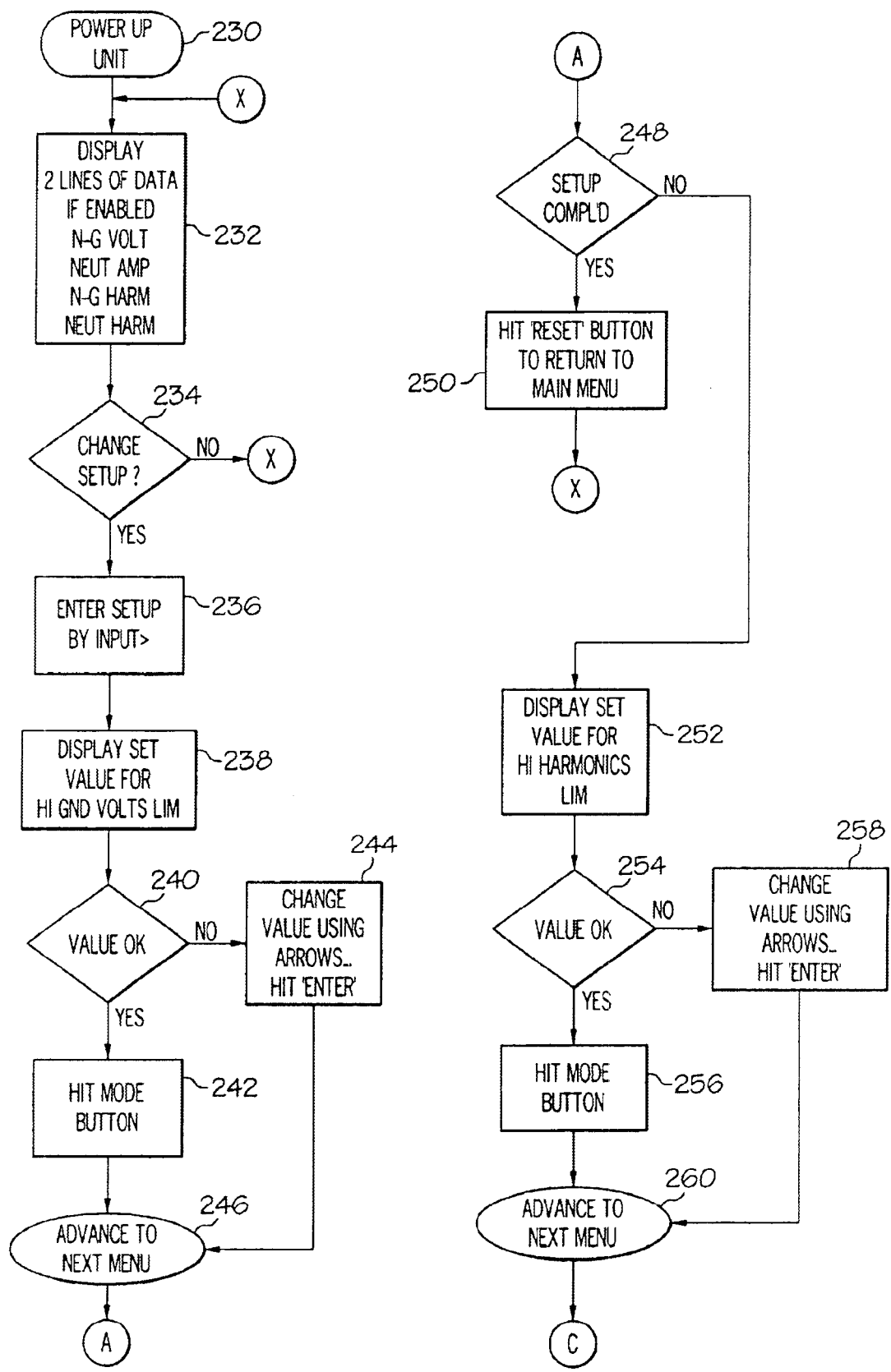
FIG. 8 (starting at FIG. 8A and continuing through FIG. 8F) illustrates an exemplary process which can be utilized to display and input parameters to be utilized by the exemplary digital processor of FIG. 6.

If the setup process is complete, then the user may return to the Main Menu by selecting an appropriate input, such as the Reset button of FIG. 3 for example. In addition, if the unit is in setup mode and no setup activity is detected for a given time, the unit returns to normal monitoring. However, if the setup is not complete, then the user can view the next settable parameter of the detector. In the example of FIG. 8A, and as shown at block 252, the stored high harmonics alarm limit setting for the N-G voltage can be displayed. The user can then make changes to that parameter using the arrow buttons and enter button, as shown at blocks 254, 258, and 260, or the user can refuse to change the parameter by hitting the Mode button, as shown at block 256. The process then continues to FIG. 8B.

Figure 8B:
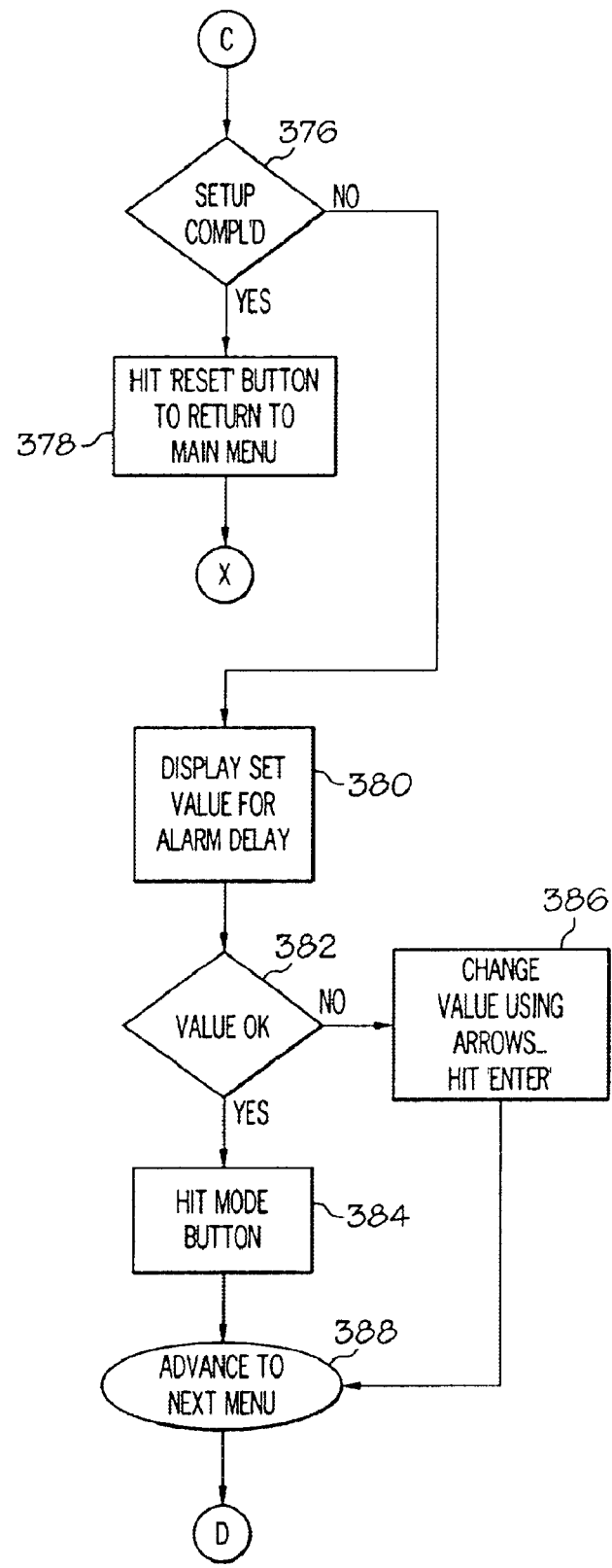
Figure 8C:
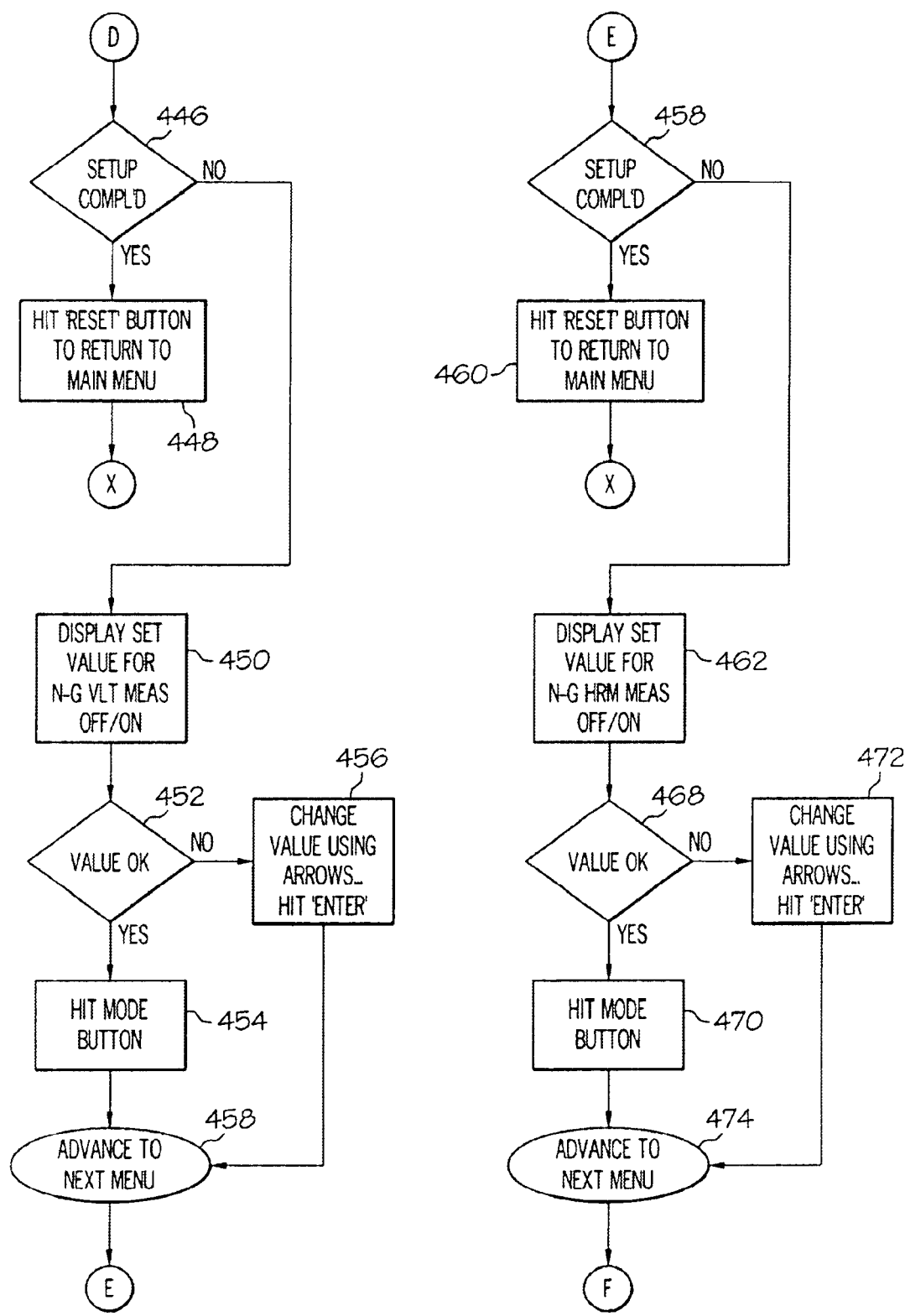
Figure 8D:
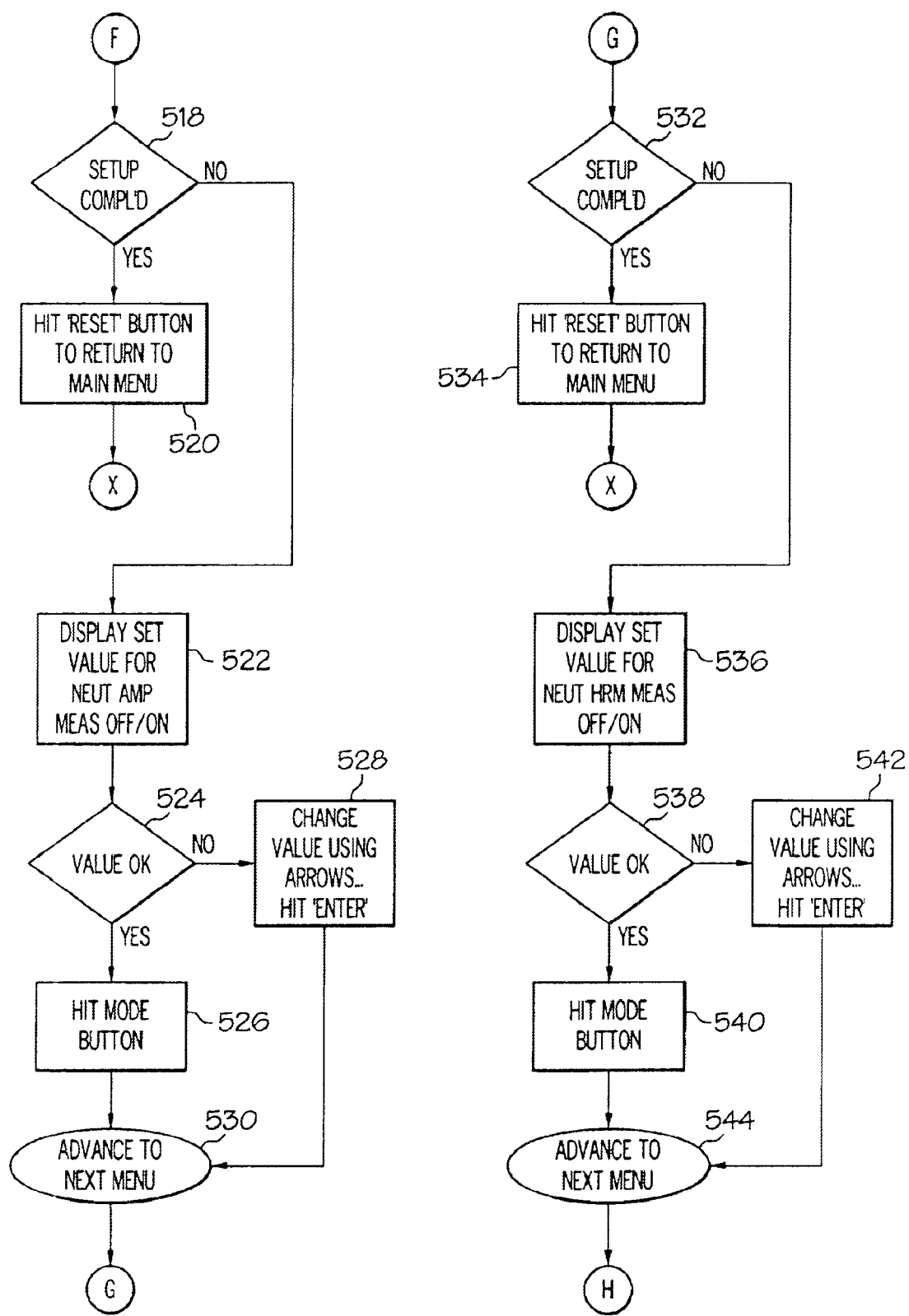

As shown in FIG. 8B, the user can end the setup process by pressing the reset button, as shown at blocks 376 and 378. However, the user can also proceed to change the alarm delay setting (the amount of time which will be counted prior to an alarm being indicated). In particular, at block 380, the delay setting can be displayed. The user can incrementally change this setting using the buttons, as shown at blocks 382, 386, and 388, or the user can simply advance to the next setting, as shown at blocks 384 and 388.

Figure 8E:
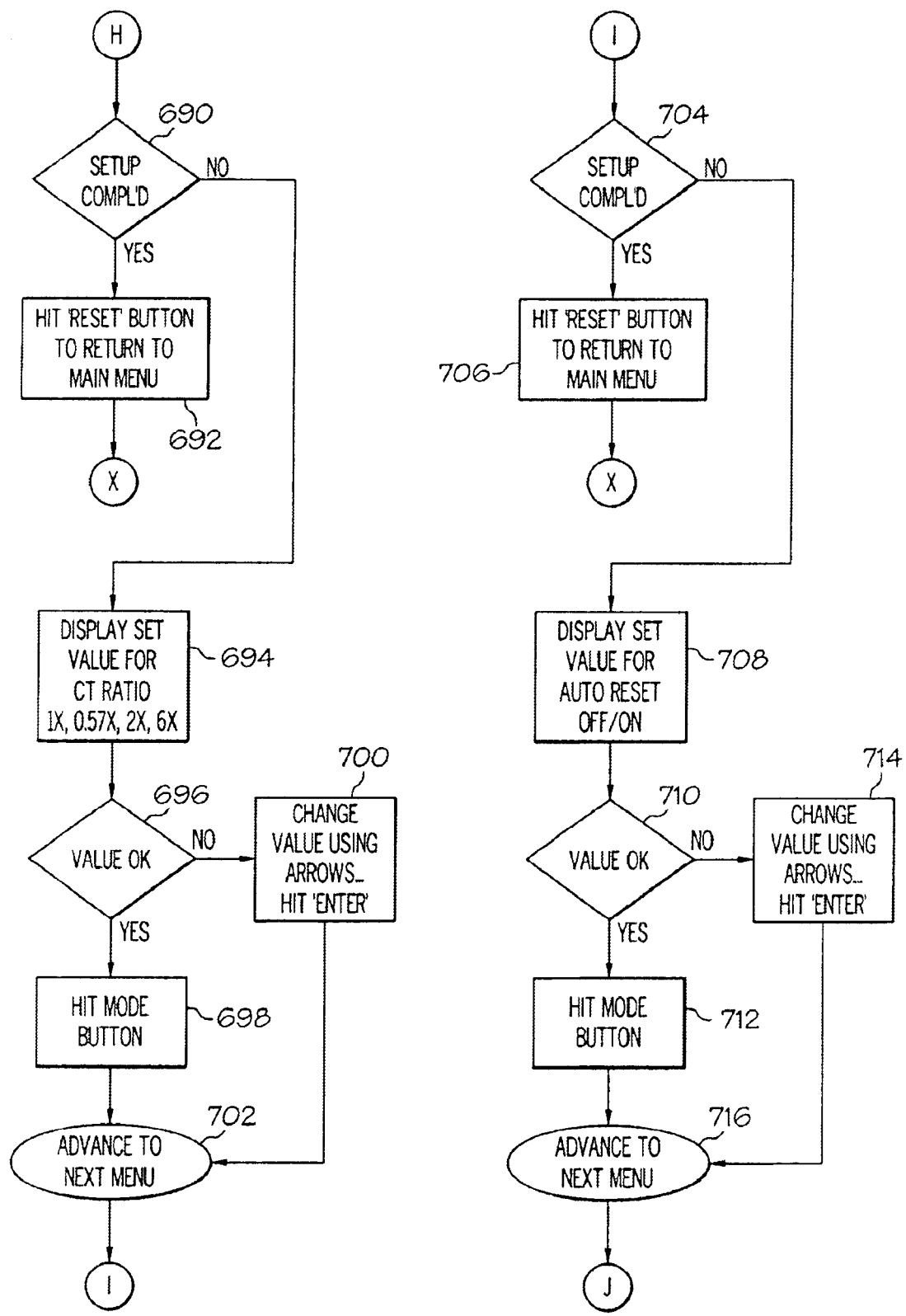

Additional changes can be made to other user-definable settings and options in a similar manner. For example, steps 446 to 456 of FIG. 8C allow the user to enable the display of the neutral-to-ground voltage limit setting, and steps 458 to 474 allow the user to enable the display of the harmonic component limit setting for the neutral-to-ground voltage. Furthermore, steps 518 to 530 of FIG. 8D allow the user to enable the display of the neutral current limit setting, and steps 532 to 544 of FIG. 8D allow the user to enable the display of the harmonic component limit setting for the neutral current. Moreover, steps 690 through 702 of FIG. 8e illustrates the setting of a current transformer which can be utilized in scaling values received by the processor. (Such a parameter can indicate the size of the current transformer which is utilized to receive the neutral current (e.g., the transformer 104 of FIG. 4) (if current monitoring, testing and detection are to be utilized)). Similarly, steps 704 through 716 of FIG. 8e allow for the enabling (i.e., turning on and off) of an automatic resetting of the ground fault alarm. This function can allow the ground fault alarm to be automatically reset after a given period of time, if it is desirable to automatically acknowledge the alarm and to re-arm the system to detect the next ground fault. Thus, multiple faults can be detected (and logged, if data logging capability is utilized).

Figure 8F:
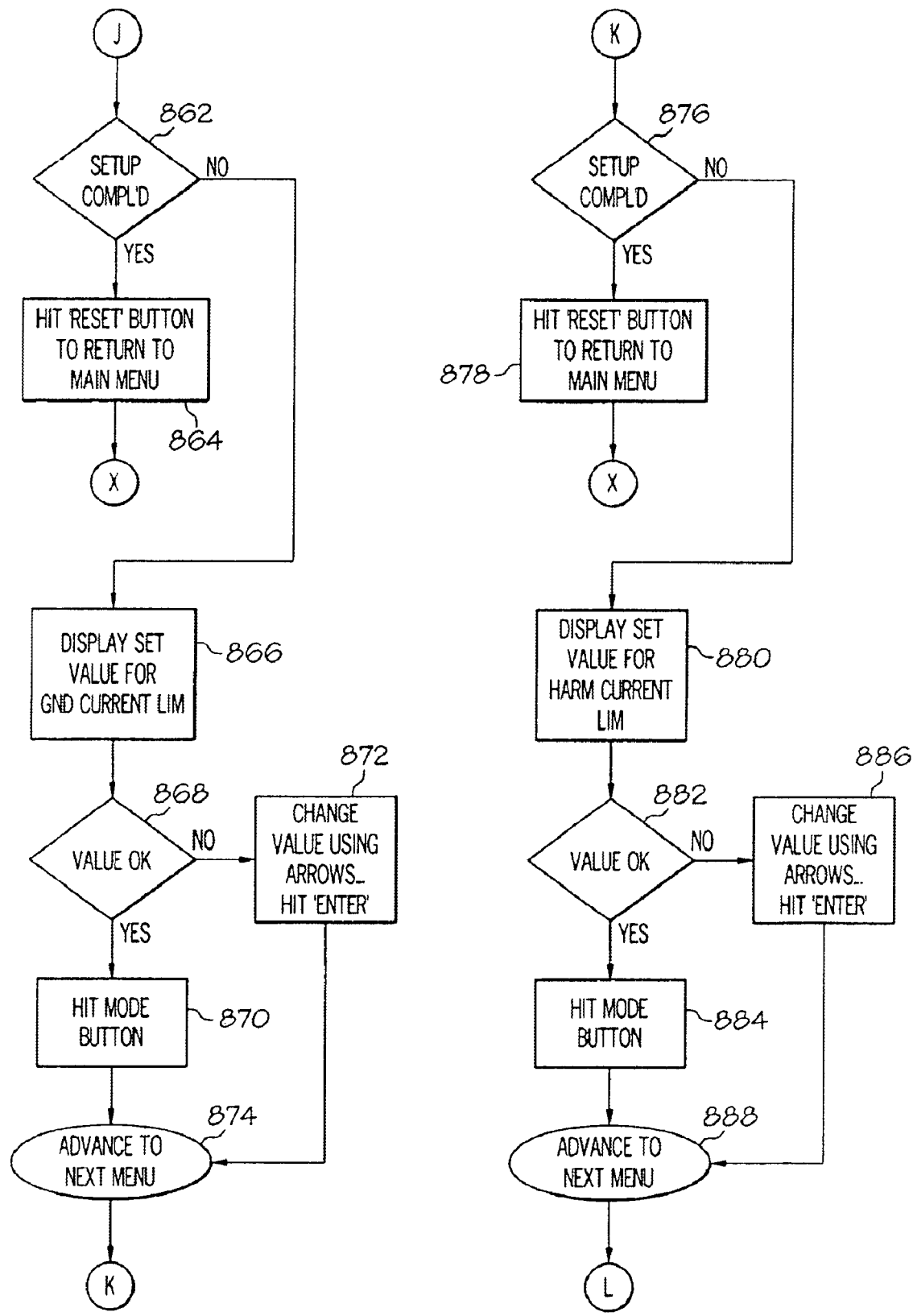

With regard to FIG. 8F, the user can also proceed to change the setting at which a high current fault is indicated. In particular, at block 866, the amperage limit can be displayed. The user can incrementally change this setting using the buttons, as shown at blocks 868, 872, and 874, or the user can simply advance to the next setting, as shown at blocks 870, and 874. In steps 876 through 888 of FIG. 8F, the user can set the high harmonic current limit, which will determine when a high harmonic alarm will be provided by the processor.

An example of the monitoring of an electrical system using an illustrative embodiment will now be described with respect to FIGS. 2 and 3. First, the user utilizes input buttons 90 and display 92 to set the various settings to be stored in the memory 86 and utilized by the processor 84 in determining whether a fault is present. In one embodiment, the neutral current and neutral voltage limit settings are provided by the user, as are the harmonic limits for the neutral current and neutral voltage. However, fewer or greater settings can be provided depending on the application of the detection system. A program (e.g., instructions, code, steps, algorithms, etc.) is provided (e.g., stored, programmed, configured, installed) that is configured to be executed by the processor 84 to determine whether an alarm condition is present.

The detection system is then ready to monitor an electrical system, such as an electrical system used in industrial applications. In particular, the neutral and phase of the electrical system to be monitored is connected to the detection system 18' at lines 53 and 51, and a power source for the detection system is connected at lines 57 and 55. A resistive impedance (e.g., resistor) 30' is connected between the neutral and ground of the monitored electrical system. The neutral-to-ground voltage is received by the power module 32', as is the neutral current. These signals are conditioned by the amplifier/calibration circuitry 68 and 69 and are switched or multiplexed by the switch 70. Then, the filter 72 provides the harmonic components of these voltage and current signals, and the harmonic components, as well as the complete signals, are converted to RMS values and amplified via circuitry 76 and 78. Switch 80 allows for the switching between the complete signal and the harmonics of that signal. Accordingly, via the switches 70 and 80, the processor 84 can switch between monitoring the neutral to ground RMS voltage, the harmonics of the neutral to ground RMS voltage, the neutral RMS current, and the harmonics of the neutral RMS current. Each of these signals is received by the processor 84 via the analog-to-digital converter and the program is utilized to compare each signal to the stored settings for each (or to determine if the allowable percent variation is being exceeded, if percentage settings are being utilized). If the setting is not exceeded, then the processor 84 can drive the Normal indicator 94 via the driver circuitry 96. However, if a current or voltage signal exceeds its respective setting, then the processor 84 can drive the Ground Fault indicator 94 via the driver circuitry. Likewise, if either of the two harmonic signals exceed their respective settings, then the processor 84 can drive the Hi Harmonic indicator 94 via the driver circuitry 96. Relays 62 can also be powered based upon these determinations by the processor 84.

If a ground fault is indicated, the user can then press the Alarm Silence button 90 to silence the alarm, or the Reset button 90 to reset the processor 84 to clear the alarm. In addition, the user can also select the Pulse input button 90 which causes the processor 84 to control the pulse contactor 34', which then introduces a locator signal, such as a current pulse signal for example, into the monitored electrical system. Accordingly, the user can then utilize an ammeter or other suitable detector to selectively monitor the system at various points. When the locator signal is no longer received during this monitoring, then the location of the fault has been found. Moreover, the signals received, the settings, and/or the alarm indications can be communicated to other digital devices through the use of the digital communications port 88.

As noted above, the operator panel 36' can connect to a personal computer or other general purpose computer through an RS232 port, or other suitable communication link, located on the panel. A software-based graphical user interface (GUI) running on the PC can then mimic the operator panel inputs 90 and display devices 94. The software program can read the configuration data within the module 36' and present the data to a user. The user is then able to modify the setup parameters on the PC and download the data to the module 36' through the digital communication link. The software can also poll the module 36' for data and alarms, and create a time/date stamp data point within the PC, which can be displayed in spreadsheet form. The software may also provide the ability to manipulate the data, such as by plotting, determining minimum and maximums, and perform other statistical analysis. In addition, the PC software can be upgraded to allow for additional processing and analysis features. As can be understood, communication links other than RS232 links can be utilized. For example, an RS485 link could be utilized for longer communication distances and to provide multidrop capability.

In this regard, FIGS. 9A–9E show illustrative screens that could be generated by such a software program. In particular, in the screen 900 of FIG. 9A, the appearance of the operator panel is mimicked. Indicators 902 are generated by the software which indicate a normal condition of the monitored electrical system, and a ground fault condition in the monitored electrical system. Moreover, a pulse indicator 902 can be provided by the software to indicate when the locator switch has been activated for locating the ground fault in the system. Other such indicators can also be generated by the software, as desired. For example, an indicator can be utilized to show a high harmonic condition in the monitored electrical system.

In addition, display boxes 904 can be generated by the software to indicate parameters of the system monitored. For example, the software can display the neutral to ground voltage as well as the neutral current.

Furthermore, input buttons 906 can be generated by the software. In this example, a reset button and an alarm silence button are provided, in order to mimic some of the buttons provided on the operator panel. In addition, if fault locator capabilities are desired, a pulse button can be utilized to initiate the locator signal (e.g., a pulsing signal).

The communication link between the computer and the operator panel allows the computer to then exchange data with the operator panel and to therefore control and operate the operator panel via the software inputs and to monitor the detector via the software display.

Figure 9A:
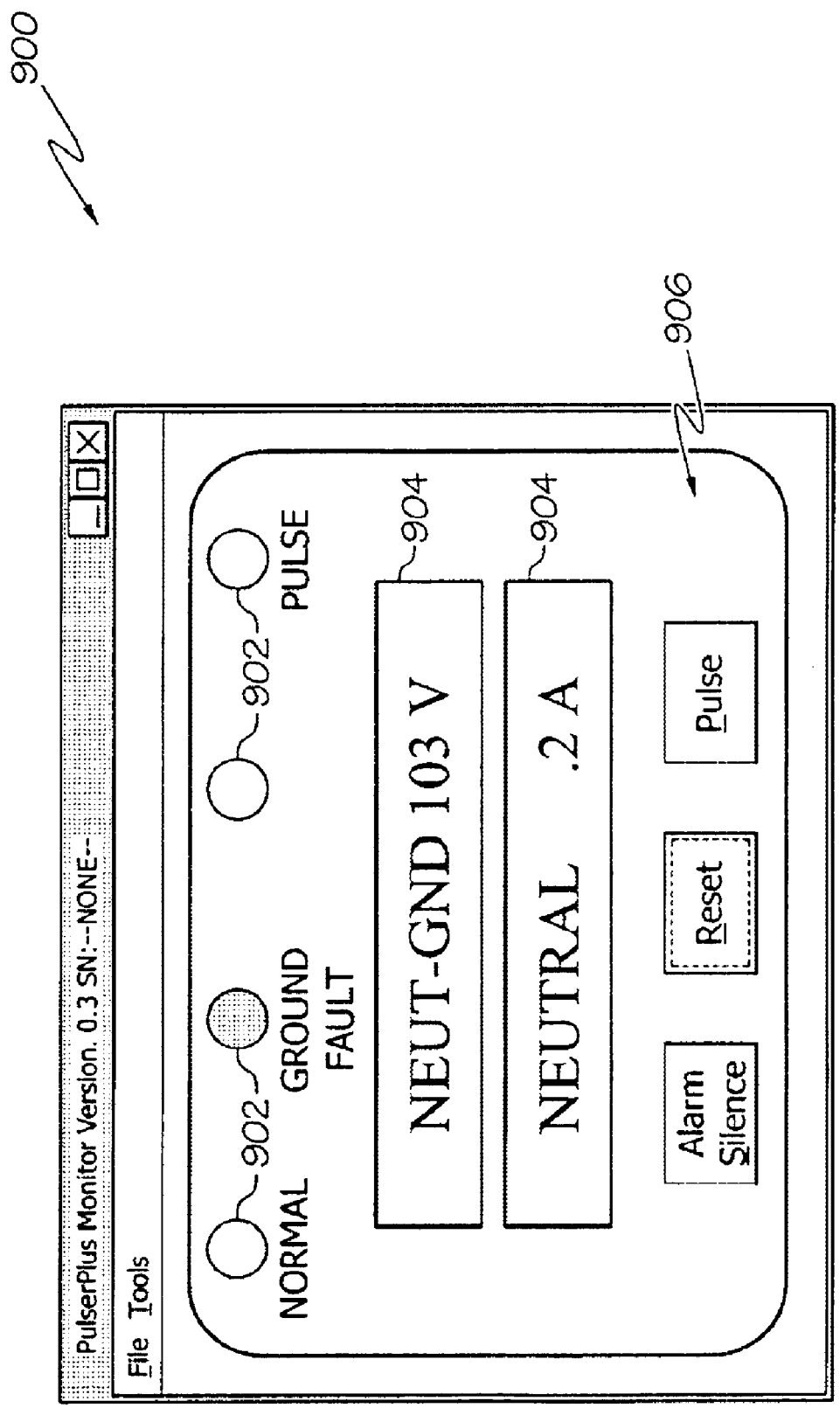
Figure 9B:
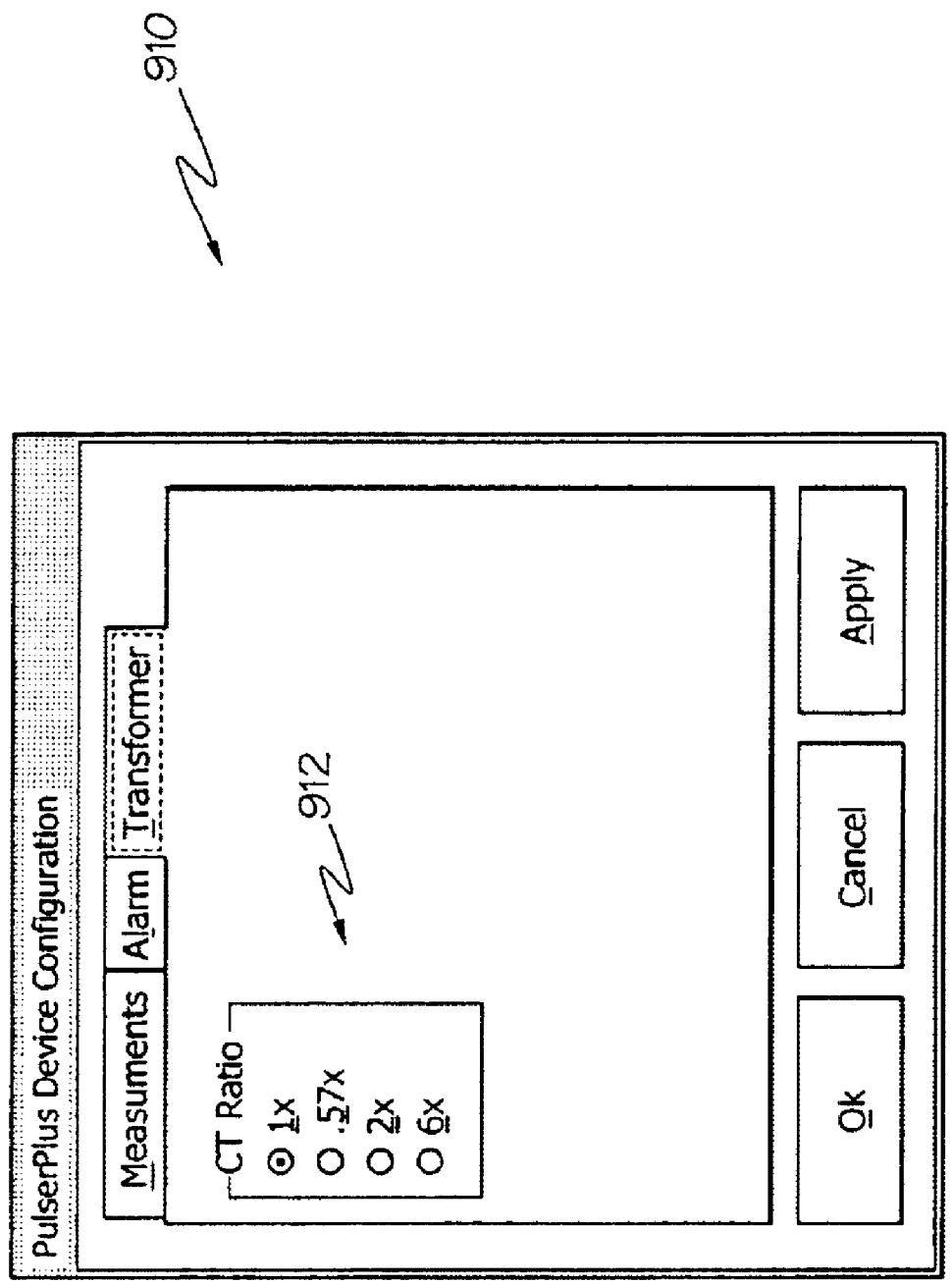
Figure 9C:
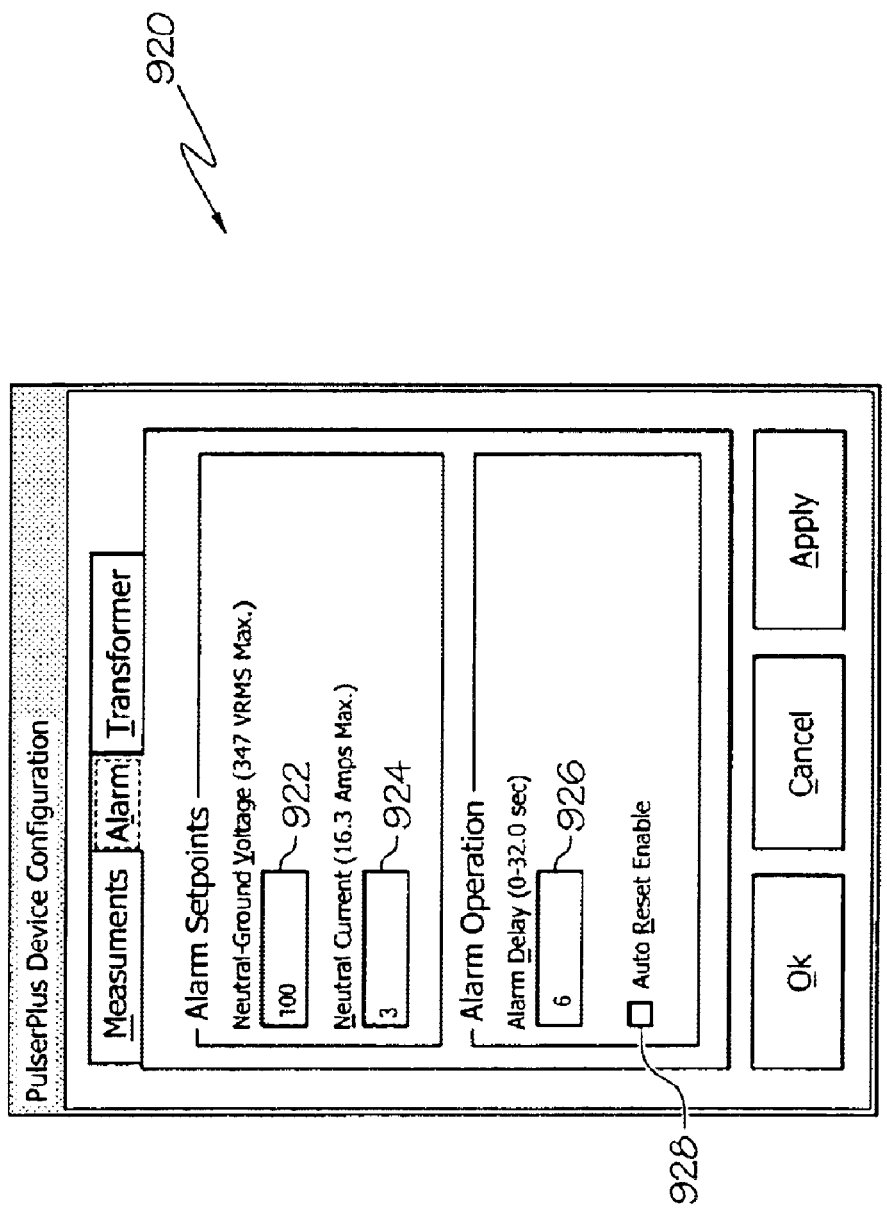
Figure 9E:
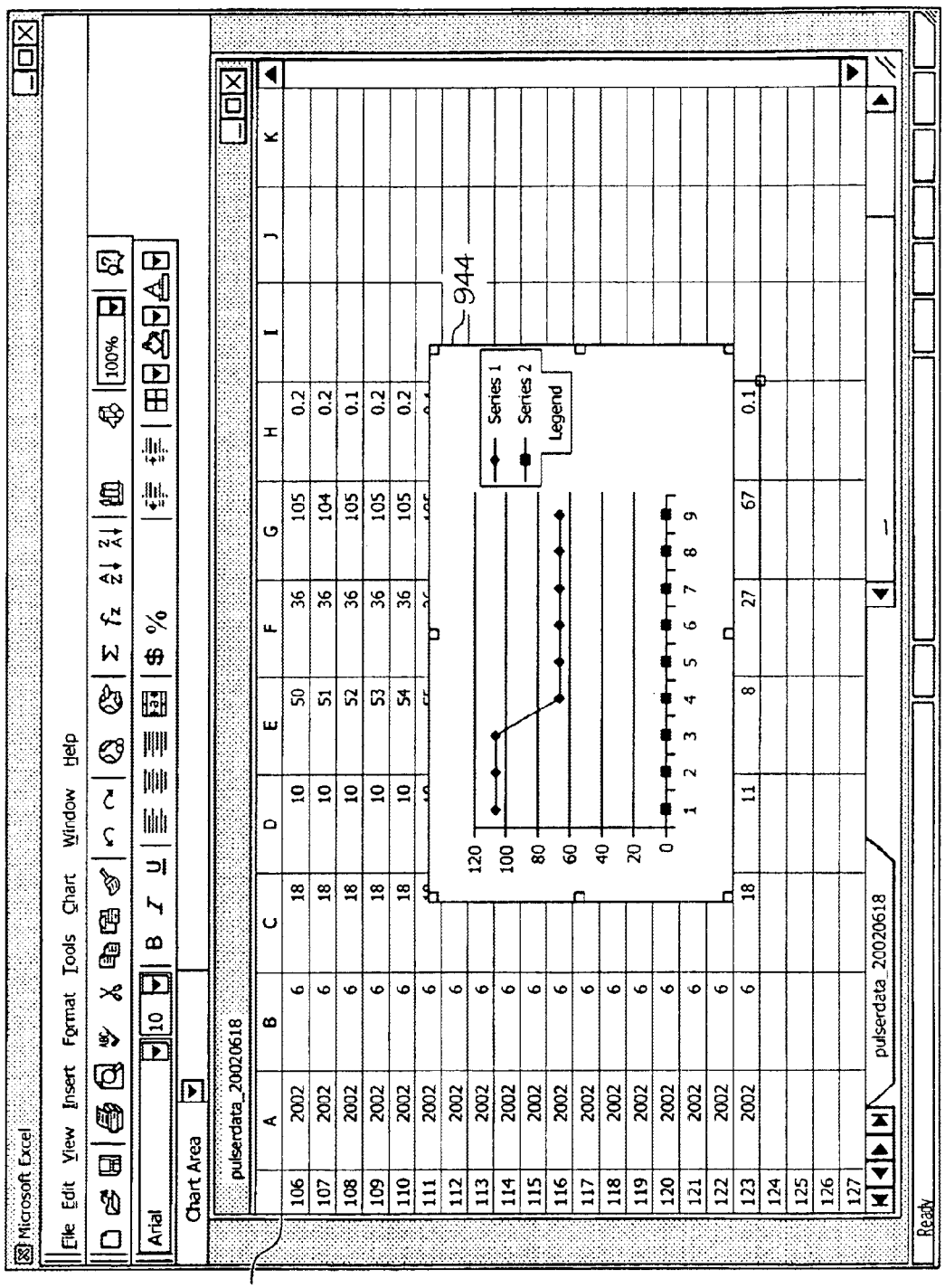

The software can also provide screens or menus to allow for the setting or control of other parameters as well. For example, in FIG. 9B, a screen 910 is provided having buttons 912 which allow for the setting of the current transformer ratio which can be utilized in scaling values received by the processor. (Such a parameter can indicate the size of the current transformer which is utilized to receive the neutral current (e.g., the transformer 104 of FIG. 4) (if current monitoring, testing and detection are to be utilized)). In this example, ratios of 1X, 0.57X, 2X, and 6X are available, although other options are possible. As another example, FIG. 9C depicts an illustrative screen 920 that can be generated by the software for setting parameters to be utilized by the ground fault detector. In particular, the alarm setpoint for the neutral-ground voltage can be set using input box 922, and the alarm setpoint for the neutral current can be set using the input box 924. In addition, the alarm time delay can be set by using the input box 926, and automatic resetting of the detector can be enabled by checkbox 928.

Data logging capability can also be provided by the computer software. In particular, as shown in the software generated screen 930 of FIG. 9D, the user can be given the option to enable data logging by using the checkbox 932. In addition, the user can indicate whether the neutral-ground voltage data logging is to be enabled, by using checkbox 934, and whether the neutral current data logging is to be enabled, by using the checkbox 936. Moreover, by using input box 938, the user can select how often the data is to be logged. Data which is logged can be stored on the computer memory or in an external memory device.

Once logged, the data can be manipulated by the software as desired. For example, as shown in the screen 940 of FIG. 9e, the data can be displayed on a spreadsheet 942. In addition, statistical analysis can be conducted on the logged data. For instance, the data can be displayed in a graph 944.

The foregoing descriptions of the exemplary embodiments of the invention have been presented for purposes of illustration and description only. They are not intended to be exhaustive or to limit the invention to the precise forms disclosed, and modifications and variations are possible and contemplated in light of the above teachings. While a number of exemplary and alternate embodiments, methods, systems, circuits, components, configurations, and potential applications have been described, it should be understood that many variations and alternatives could be utilized without departing from the scope of the invention. Accordingly, it is intended that the scope of the invention be defined by the claims appended hereto.

What is claimed is:

1. A resistance grounded electrical system, comprising:
   an electrical system providing a power source and having a phase conductor, a neutral conductor and a ground conductor;
   a neutral grounding resistor having a high resistance selected such that the ground fault current flow from the ground conductor through the resistor to the neutral conductor is provided at a value equal to or slightly greater than the capacitive charging current of the system and no greater than about 25 amps;
   a ground fault detector having:
   a neutral input configured to be connected to the neutral conductor of the electrical system;
   a ground input configured to be connected to the ground conductor of the electrical system that connects to the neutral conductor through the neutral grounding resistor;

a signal conditioning circuit connected to the neutral and ground inputs and adapted to provide a measure of an electrical parameter associated with current flowing through the neutral grounding resistor;

an analog-to-digital converter configured to convert the measure to a digital signal;

a user selectable input configured to select a neutral current value;

a digital processor configured to received the digital signal from the analog-to-digital converter and the neutral current value from the user selectable input and configured to execute a program to determine whether a ground fault has occurred based upon the level of the digital signal and the neutral current value; and a pulse contactor configured to introduce pulses into the electrical system to allow the user to locate a ground fault location when a ground fault is detected.

2. The system as recited in claim 1, wherein the electrical parameter comprises at least one of the voltage across the resistor and the current through the resistor.

3. The system as recited in claim 1, wherein the signal conditioning circuit comprises a notch filter circuit having an output providing a harmonic frequency signal of the electrical parameter, and wherein the processor is further adapted to determine whether the harmonic frequency signal exceeds a predetermined level.

4. The system as recited in claim 3, wherein the signal conditioning circuit further comprises an RMS converter circuit configured to provide an RMS signal for the harmonic frequency signal and an RMS signal for the electrical parameter.

5. The system as recited in claim 4, wherein the signal conditioning circuit further comprises a switch configured to switch between the RMS signal for the harmonic frequency signal and the RMS signal for the electrical parameter.

6. The system as recited in claim 1, wherein the signal conditioning circuit further comprises an RMS converter circuit to provide the measure as an RMS signal.

7. The system as recited in claim 1, further comprising:
a digital memory unit in communication with the processor and adapted to store ground fault limit parameters.

8. The system as recited in claim 1, further comprising:
a display in communication with the processor and configured to display the parameters.

9. The system as recited in claim 1, further comprising:
output indicators controlled by the digital processor to indicate a ground fault occurrence.

10. The system as recited in claim 9, wherein the indicators comprise a ground fault alert indicator and a high harmonic alarm indicator.

11. A high resistance grounding system, comprising
a neutral conductor configured to connect to an electrical system that provides three phase AC power of at least about 480 volts to industrial machinery;

a phase conductor configured to connect to the electrical system;

a ground connection;

a neutral grounding resistor having a high resistive impedance connected between the neutral conductor and the ground connection and having a resistance selected to limit the ground fault current flow from the ground through the resistor to the neutral conductor to a value in a range that is substantially equal to or slightly greater than the capacitive charging current of the system, wherein the resistance is selected to provide overvoltage protection such that the electrical system and industrial machinery can be continually operated even in the presence of a ground fault; and a digital processor configured to determine whether a ground fault has occurred by monitoring an electrical parameter of the high resistance resistor relating to the current flowing from the ground through the high resistance resistor to the neutral conductor;

wherein the grounding system is configured to allow the electrical system and industrial machinery to be continually operated in the presence of a ground fault.

12. The system as recited in claim 11, wherein the electrical parameter comprises at least one of a voltage and a current.

13. A ground fault detector system, comprising:

a neutral grounding resistor connected between the neutral and ground of a monitored electrical system and having a resistance selected to limit the ground fault current flow from the ground through the resistor to the neutral to a value in a range that is substantially equal to or slightly greater than the capacitive charging current of the electrical system, wherein the resistance is selected to provide overvoltage protection such that the electrical system can be continually operated even in the presence of a ground fault;

a digital detection circuit configured to determine a ground fault condition from an electrical parameter of the resistor relating to the current flow from the ground through the resistor to the neutral;

a digital communication port configured for communication with an external digital data storage apparatus; and an external digital data storage apparatus in communication with the digital detection circuit via the digital communication port and configured to receive signals from the digital detection circuit indicating the values of the electrical parameter over a time period.

14. The system as recited in claim 13, wherein the storage apparatus comprises a general purpose computer.

15. The system as recited in claim 14, further comprising:
a software program configured to be executed by the personal computer, to modify parameters to be utilized by the digital detection circuit, and to communicate the parameters to the digital detection circuit.

16. The system as recited in claim 13, wherein the digital storage apparatus comprises a general purpose computer, the system further comprising:

an operator panel in communication with the digital detection circuit and having a display device configured to display parameters to be utilized by the digital detection circuit and an input device configured to allow for user inputs to modify the parameters; and a software program configured to be executed by the general purpose computer and configured to mimic the appearance of the operator panel.

17. A ground fault detector system, comprising:

a neutral grounding resistor connected between the neutral and ground of a monitored electrical system and having a resistance selected to limit the ground fault current flow from the ground through the resistor to the neutral to a value in a range that is substantially equal to or slightly greater than the capacitive charging current of the electrical system, wherein the resistance is selected to provide overvoltage protection such that the electrical system can be continually operated even in the presence of a ground fault;

a ground input configured to connect to the ground of the monitored electrical system;

a phase input configured to connect to the phase of the monitored electrical system; and a detection circuit configured to determine a ground fault condition from an electrical parameter of the resistor and configured to detect a high harmonic condition of the electrical parameter.

18. The system as recited in claim 17, further comprising:

a filter configured to provide the harmonic components of the electrical parameter to the detection circuit.

19. The system as recited in claim 17, further comprising:

a test resistor; and a test switch configured to connect the phase input to the ground input through the test resistor, wherein the detection circuit is configured to detect the high harmonic condition of the electrical parameter when the test switch is pressed.

* * * * *

UNITED STATES PATENT AND TRADEMARK OFFICE
CERTIFICATE OF CORRECTION

PATENT NO. : 6,888,708 B2
DATED : May 3, 2005
INVENTOR(S) : William T. Brungs et al.

It is certified that error appears in the above-identified patent and that said Letters Patent is hereby corrected as shown below:

<u>Column 4,</u>
Line 15, change "providing of the present invention;" to -- providing resistance grounding for an electrical system and made in accordance with principles of the present invention --

Signed and Sealed this

Twelfth Day of July, 2005

JON W. DUDAS
*Director of the United States Patent and Trademark Office*